(12) United States Patent
Yamada et al.

(10) Patent No.: US 10,643,474 B2
(45) Date of Patent: May 5, 2020

(54) VEHICLE CONTROL DEVICE, VEHICLE CONTROL METHOD, AND RECORDING MEDIUM

(71) Applicant: HONDA MOTOR CO., LTD., Minato-ku, Tokyo (JP)

(72) Inventors: Hiroyuki Yamada, Wako (JP); Makoto Katayama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/122,957

(22) Filed: Sep. 6, 2018

(65) Prior Publication Data
US 2019/0088137 A1 Mar. 21, 2019

(30) Foreign Application Priority Data
Sep. 15, 2017 (JP) ................................. 2017-177849

(51) Int. Cl.
*G08G 1/16* (2006.01)
*B60W 50/14* (2020.01)
(Continued)

(52) U.S. Cl.
CPC .............. *G08G 1/166* (2013.01); *B60R 1/00* (2013.01); *B60R 1/06* (2013.01); *B60R 1/12* (2013.01);
(Continued)

(58) Field of Classification Search
CPC .......... G08G 1/166; G08G 1/167; B60R 1/12; B60R 2001/1215; B60W 50/14;
(Continued)

(56) References Cited

U.S. PATENT DOCUMENTS 5,901,806 A * 5/1999 Takahashi .......... B60K 31/0008
180/167
6,415,226 B1 * 7/2002 Kozak ................ G01C 21/3461
340/988

(Continued)

FOREIGN PATENT DOCUMENTS

JP 2003-231449 8/2003
JP 2004-164190 6/2004
(Continued)

OTHER PUBLICATIONS

Japanese Office Action for Japanese Patent Application No. 2017-177849 dated Jun. 4, 2019.

*Primary Examiner* — Ojiako K Nwugo
(74) *Attorney, Agent, or Firm* — Amin, Turocy & Watson, LLP

(57) ABSTRACT

A vehicle control device includes: a recognizer (110, 120) that recognizes an object present around a host vehicle; and an apparatus operation controller (130) that determines whether the object is recognized in a predetermined target area by the recognizer and causes an onboard apparatus to perform a predetermined operation when it is determined that an object has been recognized by the recognizer. The predetermined target area is set around the host vehicle, and the apparatus operation controller determines whether the host vehicle enters or has entered a predetermined branching point and lowers a level of the predetermined operation performed by the onboard apparatus when it is determined that the host vehicle enters or has entered the predetermined branching point.

11 Claims, 19 Drawing Sheets

(51) Int. Cl.
   *G06K 9/00*   (2006.01)
   *B60R 1/12*   (2006.01)
   *B60R 1/00*   (2006.01)
   *B60R 1/06*   (2006.01)

(52) U.S. Cl.
   CPC ......... *B60W 50/14* (2013.01); *G06K 9/00791*
     (2013.01); *G06K 9/00805* (2013.01); *G06K*
     *9/00825* (2013.01); *G08G 1/167* (2013.01);
     *B60R 2001/1215* (2013.01); *B60R 2300/302*
     (2013.01); *B60R 2300/804* (2013.01); *B60W*
     *2050/143* (2013.01); *B60W 2050/146*
     (2013.01); *B60W 2550/10* (2013.01)

(58) Field of Classification Search
   CPC ..... B60W 2050/143; B60W 2050/146; B60W
     2550/10; G06K 9/00805; G06K 9/00825
   USPC .......................................... 340/435; 345/435
   See application file for complete search history.

(56) References Cited

U.S. PATENT DOCUMENTS

| | | | | |
|---|---|---|---|---|
| 8,359,155 B2 * | 1/2013 | Kimura | ............... | B60W 30/025 180/167 |
| 8,386,119 B2 * | 2/2013 | Kobayashi | ......... | B60G 17/0195 180/167 |
| 9,415,719 B2 * | 8/2016 | Hayakawa | ............... | B60Q 1/143 |
| 9,914,463 B2 * | 3/2018 | Otsuka | ............... | B60W 50/082 |
| 2001/0012976 A1 * | 8/2001 | Menig | ............... | B60K 35/00 701/1 |
| 2003/0135318 A1 | 7/2003 | Tellis et al. | | |
| 2004/0080405 A1 * | 4/2004 | Hijikata | ............... | B60W 50/16 340/435 |
| 2004/0257211 A1 * | 12/2004 | Kudo | ............... | G08G 1/166 340/435 |
| 2005/0128063 A1 * | 6/2005 | Isaji | ............... | B60W 10/06 340/439 |
| 2005/0240330 A1 * | 10/2005 | Heinrichs-Bartscher | ............... | B60K 31/0008 701/48 |
| 2007/0069873 A1 * | 3/2007 | Kudo | ............... | B60Q 9/008 340/435 |
| 2009/0082949 A1 * | 3/2009 | Petrie | ............... | B60T 7/22 701/119 |
| 2009/0243823 A1 * | 10/2009 | Takahashi | ............... | G06K 9/00805 340/435 |
| 2010/0134264 A1 * | 6/2010 | Nagamine | ............... | B60Q 9/005 340/435 |
| 2010/0222958 A1 * | 9/2010 | Kobayashi | ......... | B60G 17/0195 701/31.4 |
| 2011/0205042 A1 * | 8/2011 | Takemura | ............... | G08G 1/166 340/435 |
| 2012/0158249 A1 * | 6/2012 | Xu | ............... | B60R 21/0132 701/45 |
| 2012/0293313 A1 * | 11/2012 | Yu | ............... | B60Q 9/008 340/435 |
| 2013/0177205 A1 * | 7/2013 | Kasaoki | ............... | G06K 9/00369 382/103 |
| 2014/0176321 A1 * | 6/2014 | Chen | ............... | B60W 30/14 340/435 |
| 2014/0240115 A1 * | 8/2014 | Igarashi | ............... | B60W 30/08 340/435 |
| 2014/0306833 A1 * | 10/2014 | Ricci | ............... | B60Q 1/00 340/901 |
| 2015/0002284 A1 * | 1/2015 | Matsuno | ............... | B60Q 9/00 340/435 |
| 2015/0091714 A1 * | 4/2015 | Ono | ............... | G06K 9/00791 340/435 |
| 2015/0091715 A1 * | 4/2015 | Nomura | ............... | G08G 1/166 340/435 |
| 2015/0254985 A1 * | 9/2015 | Fisher | ............... | G08G 1/166 348/148 |
| 2016/0003628 A1 * | 1/2016 | Osanai | ............... | G06K 9/00798 701/532 |
| 2016/0200318 A1 * | 7/2016 | Parikh | ............... | G01S 13/931 701/96 |
| 2016/0259334 A1 * | 9/2016 | Hashimoto | ......... | B60W 50/082 |
| 2016/0280236 A1 * | 9/2016 | Otsuka | ............... | B60W 10/20 |
| 2016/0304126 A1 * | 10/2016 | Yamaoka | ............... | B62D 15/0255 |
| 2016/0307054 A1 * | 10/2016 | Takemura | ............... | G06K 9/00791 |
| 2016/0362116 A1 * | 12/2016 | Otsuka | ............... | G05D 1/0061 |
| 2017/0028995 A1 * | 2/2017 | Mori | ............... | G01D 7/10 |
| 2017/0148327 A1 * | 5/2017 | Sim | ............... | G08G 1/167 |

FOREIGN PATENT DOCUMENTS

| | | |
|---|---|---|
| JP | 2006-059095 | 3/2006 |
| JP | 2007-226666 | 9/2007 |
| JP | 2007-286898 | 11/2007 |
| JP | 2008-068751 | 3/2008 |
| JP | 2008-152387 | 7/2008 |
| JP | 2008-262401 | 10/2008 |
| JP | 2009-003795 | 1/2009 |
| JP | 2009-301400 | 12/2009 |
| JP | 2011-025862 | 2/2011 |

\* cited by examiner

VEHICLE CONTROL DEVICE, VEHICLE CONTROL METHOD, AND RECORDING MEDIUM

CROSS-REFERENCE TO RELATED APPLICATION

This application claims priority to and the benefit from Japanese Patent Application No. 2017-177849, filed on Sep. 15, 2017, the contents of which are hereby incorporated by reference into the present application.

BACKGROUND

Field of the Invention

The present invention relates to a vehicle control device, a vehicle control method, and a recording medium.

Description of Related Art

Conventionally, a technique in which, upon detecting a two-wheel vehicle entering into a surrounding area of a host vehicle, it is determined whether a driver is looking at a rear-view mirror and takes a safe driving action (for example, an action of changing a driving lane to a right-side lane), and when both conditions are satisfied, a warning message is stopped or a warning message is not output is known (for example, see Japanese Patent Application Publication No. 2007-286898).

SUMMARY

However, the conventional technique prevents the output of a warning message when a safe driving action is taken on condition that a driver is looking at a two-wheel vehicle and may not be used for a purpose of preventing the output of a warning message for an object to which it is less necessary to pay attention.

Embodiments of the present invention are made in view of such circumstances, and one of the objects thereof is to provide a vehicle control device, a vehicle control method, and a recording medium in which unnecessary operations are able to be prevented.

A vehicle control device, a vehicle control method, and a recording medium according to the present invention employ the following configurations.

(1) A vehicle control device according to an embodiment of the present invention includes: a recognizer that recognizes an object present around a host vehicle; and an apparatus operation controller that determines whether the object has been recognized in a predetermined target area by the recognizer and causes an onboard apparatus to perform a predetermined operation when it is determined that such an object has been recognized by the recognizer, wherein the predetermined target area is set around the host vehicle, and the apparatus operation controller determines whether the host vehicle enters or has entered a predetermined branching point and lowers a level of the predetermined operation performed by the onboard apparatus when it is determined that the host vehicle enters or has entered the predetermined branching point.

(2) In Embodiment (1), the predetermined operation includes at least one of an operation of notifying of a likelihood of contact between the host vehicle and the object and an operation of avoiding contact between the host vehicle and the object.

(3) In Embodiment (1), the apparatus operation controller lowers the level of the predetermined operation executed in a lowering case as compared to the level of the predetermined operation executed in a case other than a lowering case, and the lowering case includes a case in which the object recognized in the target area by the recognizer is traveling along another lane adjacent to a host lane along which the host vehicle is traveling, the other lane being located on a side away from a branching lane extending from the branching point.

(4) In Embodiment (3), when the host vehicle has moved to the branching lane, the apparatus operation controller lowers the level of the predetermined operation for the object recognized in a lane along which the host vehicle has been traveling before the host vehicle moved to the branching lane.

(5) In Embodiment (1), the target area includes an area to the side and an area behind the host vehicle, and the apparatus operation controller lowers the level of the predetermined operation for an object recognized in the rear-side area by the recognizer as compared to the level of the predetermined operation for an object recognized in the area to the side by the recognizer.

(6) In Embodiment (1), when an object in the target area recognized by the recognizer is on a branching lane extending from the branching point, the apparatus operation controller does not lower the level of the predetermined operation for the object.

(7) In Embodiment (1), the apparatus operation controller determines whether the host vehicle is traveling on an expressway on the basis of a history of a traveling speed of the host vehicle and determines that the host vehicle enters or has entered the predetermined branching point when the host vehicle is in a decelerating state of a predetermined level or higher and a lateral movement such that the host vehicle changes lane is detected after it has been determined that the host vehicle is traveling on an expressway.

(8) In Embodiment (1), the apparatus operation controller determines whether the host vehicle enters or has entered the predetermined branching point on the basis of map information and position information of the host vehicle.

(9) In Embodiment (1), the apparatus operation controller determines that the host vehicle enters or has entered the predetermined branching point when a predetermined mark has been detected in an image input from a camera that has captured an image of a side in front of the host vehicle, and then, a behavior of the host vehicle moving toward the predetermined mark is detected.

(10) In Embodiment (1), the apparatus operation controller lowers the level of the predetermined operation by changing notification details for notifying of the likelihood of contact between the host vehicle and the object.

(11) In Embodiment (1), the apparatus operation controller executes the predetermined operation according to a result of comparing a threshold with a collision margin time which is a predicted time until contact between the object and the host vehicle will occur and lowers the level of the predetermined operation by changing the threshold.

(12) A vehicle control method according to an embodiment of the present invention is a vehicle control method using an onboard computer mounted on a vehicle, the method causing the onboard computer to execute: recognizing an object present around a host vehicle; determining whether the object is recognized in a predetermined target area set around the host vehicle; causing an onboard apparatus to perform a predetermined operation when it is determined that an object has been recognized in the target area; determining whether the host vehicle enters or has entered a predetermined branching point; and lowering a level of the predetermined operation performed by the onboard apparatus when it is determined that the host vehicle enters or has entered a predetermined branching point.

(13) A recording medium according to an embodiment of the present invention is a non-transitory computer-readable recording medium having a program stored therein, the program causing an onboard computer to execute: recognizing an object present around a host vehicle; determining whether the object is recognized in a predetermined target area set around the host vehicle; causing an onboard apparatus to perform a predetermined operation when it is determined that an object has been recognized in the target area; determining whether the host vehicle enters or has entered a predetermined branching point; and lowering a level of the predetermined operation performed by the onboard apparatus when it is determined that the host vehicle enters or has entered a predetermined branching point.

According to Embodiments (1) to (13), it is possible to prevent unnecessary operations.

DESCRIPTION OF EMBODIMENTS

Hereinafter, an embodiment of a vehicle control device, a vehicle control method, and a recording medium according to the present invention will be described with reference to the drawings. Although a case in which vehicles drive on the left side of a road will be described, left and right may be reversed for a case in which vehicles drive on the right side of a road.

[Overall Configuration]

Figure 1:
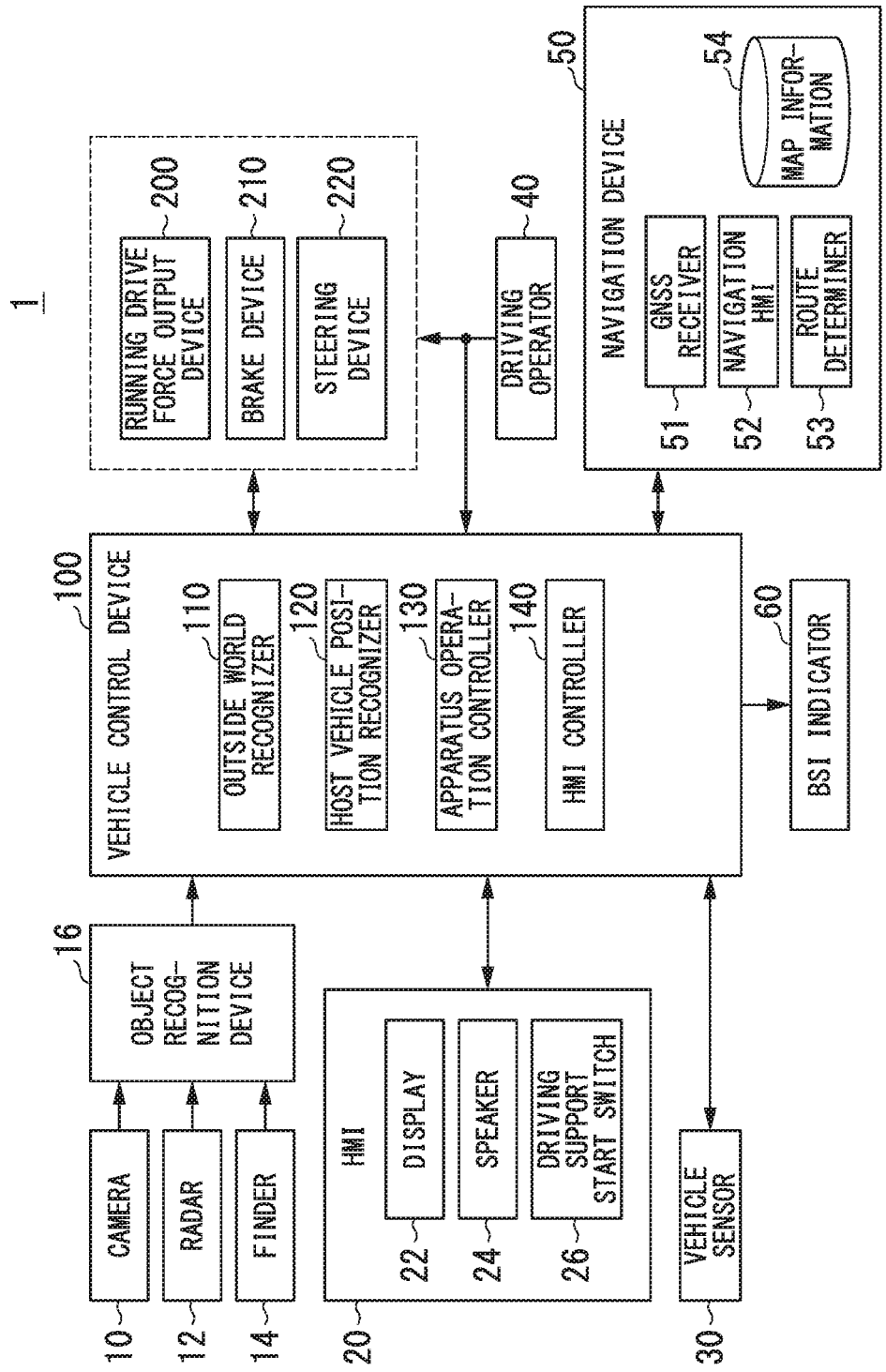
FIG. 1 is a diagram of a vehicle control system according to an embodiment.

FIG. 1 is a diagram of a vehicle control system 1 according to an embodiment. A vehicle (hereinafter referred to as a host vehicle M) on which the vehicle control system 1 is mounted is a two-wheel vehicle, a three-wheel vehicle, or a four-wheel vehicle, for example, and a driving source thereof is an internal combustion engine such as a diesel engine or a gasoline engine, a motor, or a combination thereof. The motor operates using electric power generated by a power generator connected to an internal combustion engine or electric power discharged by a secondary battery or a fuel cell. The vehicle control system 1 includes, for example, a camera 10, a radar 12, a finder 14, an object recognition device 16, a human machine interface (HMI) 20, a vehicle sensor 30, a driving operator 40, a navigation device 50, a blind spot information (BSI) indicator 60, a vehicle control device 100, a running drive force output device 200, a brake device 210, and a steering device 220. These devices and apparatuses are connected to each other by a multiplex communication line such as a controller area network (CAN), a serial communication line, a wireless communication line, and the like. The components illustrated in FIG. 1 are examples only, and some components may be omitted and other components may be added.

The camera 10 is a digital camera which uses a solid-state imaging device such as a charge coupled device (CCD) or a complementary metal oxide semiconductor (CMOS), for example. One or a plurality of cameras 10 are attached to an arbitrary position on the host vehicle M. For example, when the camera 10 captures the images of the side in front, the camera 10 is attached to an upper portion of a front windshield or a rear surface of a rear-view mirror. The camera 10 captures the images of the surroundings of the host vehicle M periodically and repeatedly, for example. The camera 10 may be a stereo camera.

The radar 12 radiates radio waves such as millimeter waves to the surroundings of the host vehicle M to detect radio waves (reflected waves) reflected by objects to detect at least the positions of (distances and directions to) objects. One or a plurality of radars 12 are attached to an arbitrary position on the host vehicle M. The radar 12 may detect the position and the speed of an object according to a frequency modulated continuous wave (FM-CW) scheme.

The finder 14 is a light detection and ranging or a laser imaging detection and ranging (LIDAR) finder that measures scattered light of emission light to measure a distance to a target, for example. One or a plurality of finders 14 are attached to an arbitrary position on the host vehicle M.

The object recognition device 16 performs sensor fusion processing on the detection results obtained by some or all of the camera 10, the radar 12, and the finder 14 to recognize the position, the type, the speed, the moving direction, and the like of an object. An object to be recognized includes, for example, a guard rail, a telegraph pole, a pedestrian, a road sign, a signboard, and the like as well as a vehicle, and will be referred to as a neighboring vehicle or the like. The object recognition device 16 outputs a recognition result to the vehicle control device 100. The object recognition device 16 may output some of pieces of information input from the camera 10, the radar 12, or the finder 14 to the vehicle control device 100 as they are.

The HMI 20 presents various pieces of information to an occupant of the host vehicle M and receives input operations of an occupant. The HMI 20 includes, for example, a display 22, a speaker 24, various buttons such as a driving support start switch 26, a microphone, a buzzer, and the like. The respective apparatuses of the HMI 20 are attached to respective parts of an instrument panel and arbitrary positions of an assistant-driver's seat or the rear seats.

Figure 2:
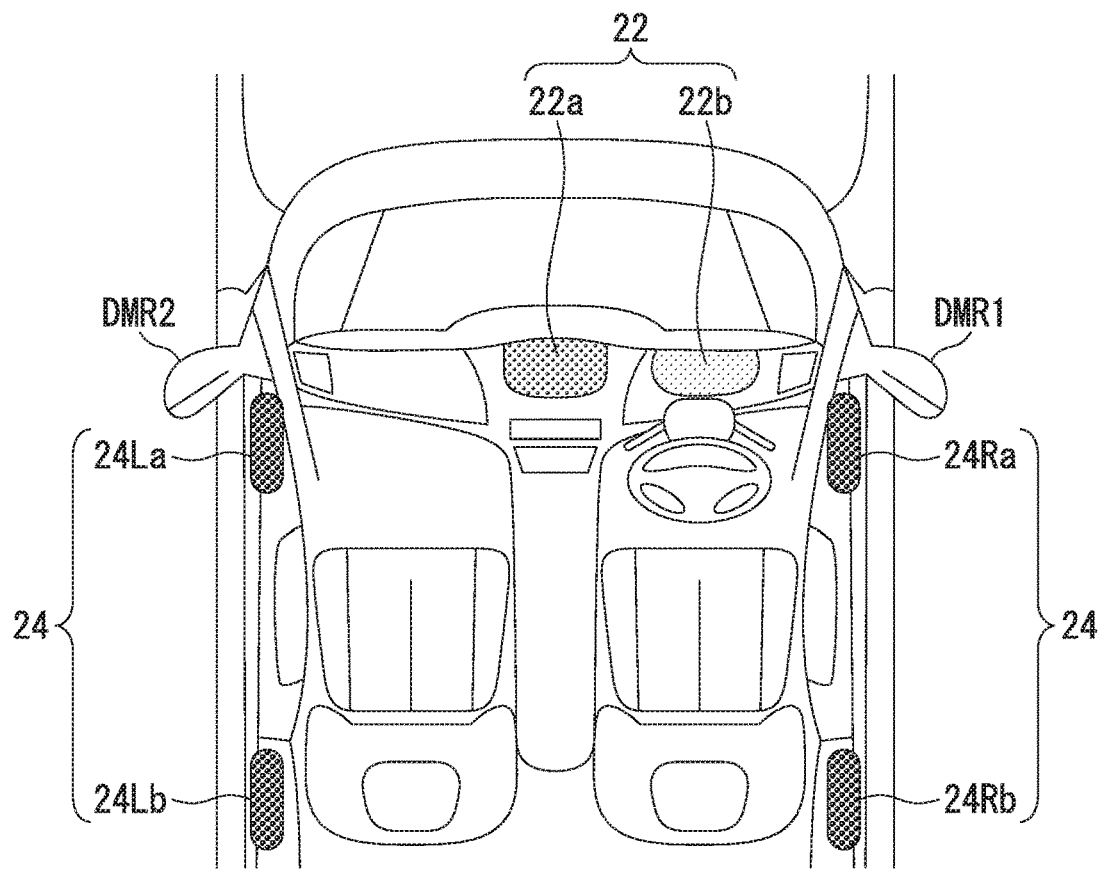
FIG. 2 is a diagram illustrating an example of a vehicle interior when a host vehicle M is seen from above.

FIG. 2 is a diagram illustrating an example of a vehicle interior when the host vehicle M is seen from above. As illustrated in FIG. 2, for example, the display 22 is provided in a dashboard (indicated by reference numeral 22a) positioned under the front windshield and installed on a surface in front of a driver's seat and an assistant-driver's seat. The display 22 may function as an instrument panel installed on a surface (indicated by reference numeral 22b) in front of a driver's seat, for example, to display meters such as a speedometer and a tachometer.

The display 22 may be various display devices such as a liquid crystal display (LCD) or an organic electroluminescence (EL) display, for example. The display 22 displays an image output by a HMI controller 140 of the vehicle control device 100. The display 22 may be a touch panel that receives operations of an occupant on a screen.

The speakers 24 include four speakers that output sound from left and right sides and the side behind the driver of the host vehicle M. For example, a speaker 24La is installed near a door closest to the assistant-driver's seat, a speaker 24Ra is installed near a door closest to the driver's seat, a speaker 24Lb is installed near a door closest to a rear seat behind the assistant-driver's seat, and a speaker 24Rb is installed near a door closest to a rear seat behind the driver's seat. The speaker 24 outputs sound, an alarm sound, and the like according to the control of the HMI controller 140 or a notification controller 134 to be described later, for example.

The driving support start switch 26 is a switch for causing the vehicle control device 100 to start driving support control. The driving support control is a control state of controlling the running drive force output device 200 and any one or both of the brake device 210 and the steering device 220, for example, as necessary. On the other hand, when the driving support start switch 26 is not operated (that is, the vehicle control device 100 does not execute the driving support control), the devices 200, 210, and 220 are operated in a manual driving mode. In a manual driving mode, the running drive force output device 200, the brake device 210, and the steering device 220 are controlled according to an operation amount of the driving operators 40 by an occupant. The vehicle sensors 30 include, for example, a vehicle speed sensor that detects the speed of the host vehicle M, an acceleration sensor that detects an acceleration, a yaw-rate sensor that detects an angular speed (yaw rate) around a vertical axis of the center of gravity of the host vehicle M, and an azimuth sensor that detects a direction of the host vehicle M. The speed includes at least one of a longitudinal speed in a traveling direction of the host vehicle M and a lateral speed in a lateral direction of the host vehicle M, for example. The acceleration includes at least one of a longitudinal acceleration in the traveling direction of the host vehicle M and a lateral acceleration in the lateral direction of the host vehicle M, for example. The respective sensors included in the vehicle sensor 30 output detection signals indicating detection results to the vehicle control device 100.

The driving operator 40 includes various operators such as a steering wheel steered by an occupant, a winker lever for operating a winker (a direction indicator), an acceleration pedal, a brake pedal, and a shift lever, for example. An operation detection unit that detects an operation amount of an occupant's operation, for example, is attached to each operator of the driving operator 40. The operation detection unit detects the position of a winker lever, a depression amount of an acceleration pedal and a brake pedal, the position of a shift lever, a steering angle and a steering torque of a steering wheel, and the like. The operation detection unit outputs detection signals indicating the detection results to the vehicle control device 100 or the running drive force output device 200 and any one or both of the brake device 210 and the steering device 220.

The navigation device 50 includes a global navigation satellite system (GNSS) receiver 51, a navigation HMI 52, and a route determiner 53, and stores map information 54 in a storage such as a hard disk drive (HDD) or a flash memory. The GNSS receiver 51 identifies the position of the host vehicle M on the basis of signals received from GNSS satellites. The position of the host vehicle M may be specified or compensated by an inertial navigation system (INS) that uses the output of the vehicle sensor 30. The navigation HMI 52 includes a display device, a speaker, a touch panel, keys, and the like. Some or all of the components of the navigation HMI 52 may be shared by the HMI 20. The route determiner 53 determines a route from the position of the host vehicle M specified by the GNSS receiver 51 (or an arbitrary input position) to a destination (for example, including information on a stopover when traveling to the destination) input by an occupant using the navigation HMI 52, for example, by referring to the map information 54.

The map information 54 is information in which a road shape is represented by links indicating roads and nodes connected by links. The map information 54 includes information on the center of a lane or information on the boundaries of a lane, for example. The map information 54 may include road information, traffic regulations information, address information (an address and a zip code), facility information, telephone number information, and the like. The road information includes information indicating the type of a road such as an expressway, a toll road, a national highway, or a public road and information on a recommended speed on a road, the number of lanes of a road, a width of each lane, a gradient of a road, the position of a road (3-dimensional coordinates including a latitude, a longitude, and a height), a curvature of a road or a curve of each lane of the road, the positions of merging and branching points of a lane, and signs provided on a road. The recommended speed is a legal speed limit or an average speed of a plurality of vehicles having traveled on the road, for example. The navigation device 50 provides route guidance using the navigation HMI 52 on the basis of a route detected by the route determiner 53.

The navigation device 50 may communicate with an external server and provide route guidance on the basis of a route determined by the external server.

The BSI indicator 60 is a device that displays a predetermined warning image 60a on a portion of a mirror surface of a door mirror DMR, for example. When the BSI indicator 60 is operated, an illumination device emits light from behind the door mirror DMR and the warning image 60a formed in the mirror surface appears. The door mirror DMR is provided in a door closest to the driver's seat and a door closest to the assistant-driver's seat, for example (indicated by reference numerals DMR1 and DMR2 in FIG. 2). The warning image 60a is an illustration for notifying an occupant of a fact that another vehicle is approaching the host vehicle M or is expected to approach at a certain future time point, for example.

Figure 3:
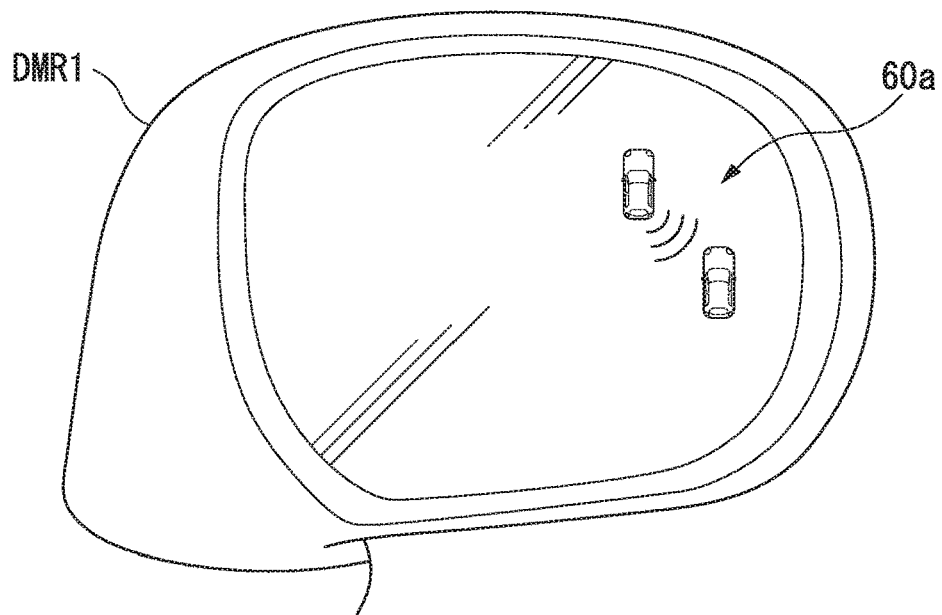
FIG. 3 is a diagram illustrating an example of a door mirror.

FIG. 3 is a diagram illustrating an example of the door mirror DMR1. As illustrated in FIG. 3, a warning image 60a for notifying an occupant of the fact that another vehicle recognized by the object recognition device 16 is approaching from the right side of the host vehicle M is displayed on a portion of the mirror surface of the door mirror DMR1 attached to the right side of the host vehicle M. On the other hand, when another vehicle recognized by the object recognition device 16 approaches from the left side of the host vehicle M, the warning image 60a is displayed on the door mirror DMR2 attached to the left side of the host vehicle M.

Before description of the vehicle control device 100 is provided, the running drive force output device 200, the brake device 210, and the steering device 220 will be described. The running drive force output device 200 outputs a travel drive force (torque) for allowing the host vehicle M to travel to a driving wheel. The running drive force output device 200 includes a combination of an internal combustion engine, a motor, and a transmission and a power electronic controller (ECU) for controlling these components. The power ECU controls the above-described components according to information input from the vehicle control device 100 or information input from the driving operator 40.

The brake device 210 includes a brake caliper, a cylinder that transmits hydraulic pressure to the brake caliper, an electric motor that generates hydraulic pressure in the cylinder, and a brake ECU. The brake ECU controls an electric motor according to information input from the vehicle control device 100 or information input from the driving operator 40 so that a brake torque corresponding to a brake operation is output to respective wheels. The brake device 210 may include a backup mechanism for transmitting the hydraulic pressure generated by an operation of the brake pedal included in the driving operator 40 to the cylinder via a master cylinder. The brake device 210 is not limited to the above-described configuration and may be an electronically controlled hydraulic brake device that controls an actuator according to information input from the vehicle control device 100 to transmit a hydraulic pressure of a master cylinder to a cylinder.

The steering device 220 includes a steering ECU and an electric motor, for example. The electric motor applies force to a rack-and-pinion function to change the direction of a steering wheel, for example. The steering ECU drives the electric motor according to the information input from the vehicle control device 100 or the information input from the driving operator 40 to change the direction of a steering wheel.

[Configuration of Vehicle Control Device]

Returning to FIG. 1, the vehicle control device 100 includes an outside world recognizer 110, a host vehicle position recognizer 120, an apparatus operation controller 130, and a HMI controller 140, for example. These components are components that execute driving support control and are realized when the driving support start switch 26 is operated whereby a hardware processor such as a central processing unit (CPU), for example, executes programs (software). Some or all of these components may be realized by hardware (circuit unit; including circuitry) such as a large scale integration (LSI), application specific integrated circuit (ASIC), field-programmable gate array (FPGA), and graphics processing unit (GPU) and may be realized by cooperation of software and hardware. Programs may be stored in advance in a storage such as hard disk drive (HDD) or flash memory and may be stored in a removable recording medium such as DVD or CD-ROM and be installed on a storage when the recording medium is attached to a drive device. These components may be realized by one processor and may be realized by a plurality of processors. In the latter case, for example, the vehicle control device 100 may be a system obtained by combining a plurality of electronic controllers (ECUs). A combination of the outside world recognizer 110 and the host vehicle position recognizer 120 is an example of a "recognizer". The "recognizer" may include the object recognition device 16.

The outside world recognizer 110 recognizes the state such as the position, the speed, and the acceleration, and the like of a neighboring vehicle or the like present around the host vehicle M on the basis of the information input from the camera 10, the radar 12, and the finder 14 via the object recognition device 16. The neighboring vehicle or the like includes a guard rail, a telegraph pole, a pedestrian, a road sign, a signboard, and the like as well as a vehicle. The position of the neighboring vehicle or the like may be represented by a representative point such as the center of gravity or a corner of the neighboring vehicle or the like and may be represented by an area represented by an outline of the neighboring vehicle or the like. The "state" of the neighboring vehicle or the like may include an acceleration and a jerk or "action state" (for example, the neighboring vehicle is changing lane or is trying to change lane) of the neighboring vehicle or the like.

The host vehicle position recognizer 120 specifies the position of the host vehicle M on the basis of the signals received from GNSS satellites by a global navigation satellite system (GNSS) receiver (not illustrated). The position of the host vehicle M may be specified or compensated by an inertial navigation system (INS) that uses the output of the vehicle sensor 30.

The host vehicle position recognizer 120 recognizes a lane (a host lane) along which the host vehicle M travels and a relative position and an attitude of the host vehicle M with respect to the host lane, for example. For example, the host vehicle position recognizer 120 recognizes lane markings LM on a road from an image captured by the camera 10 and recognizes a lane defined by two lane markings LM closest to the host vehicle M among a plurality of recognized lane markings LM as a host lane. The lane markings LM may include edges of a road, curbs, fences, and the like provided on the edges of a road as well as lines drawn on a road. The host vehicle position recognizer 120 recognizes the position and the attitude of the host vehicle M with respect to the recognized host lane.

Figure 4:
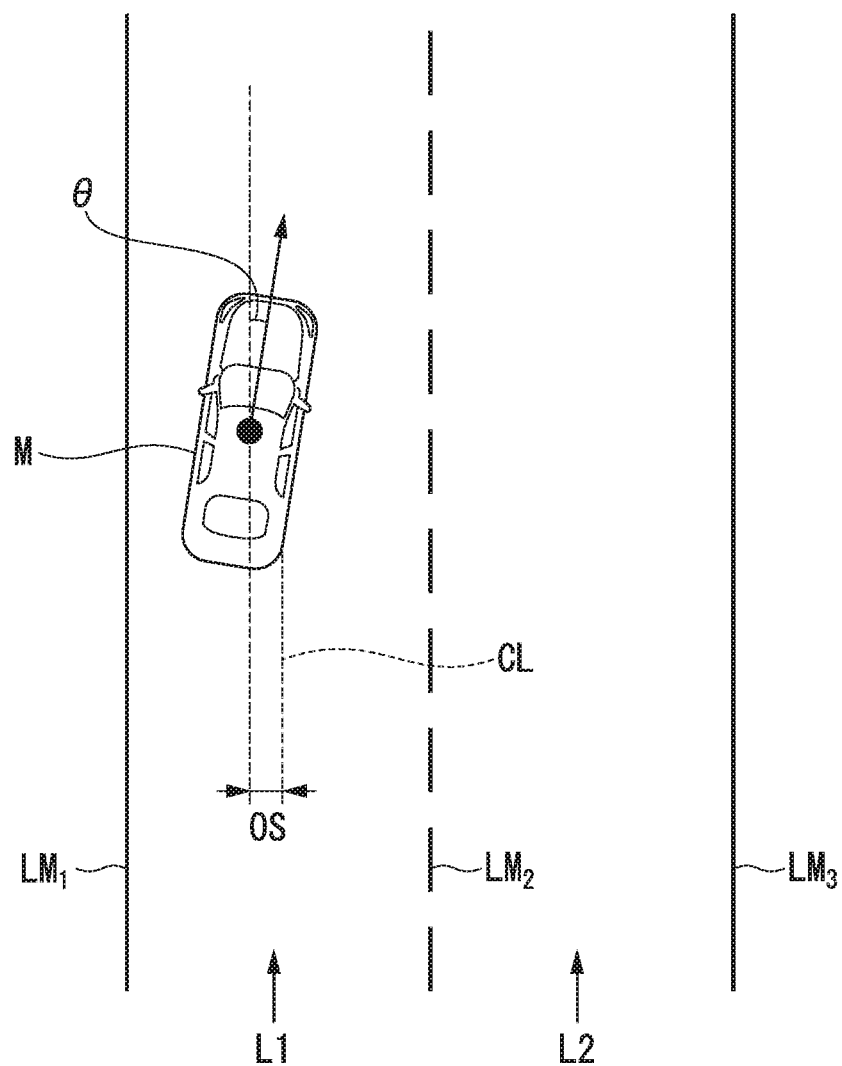
FIG. 4 is a reference diagram for describing a relative position and an attitude of a host vehicle M with respect to a traveling lane.

FIG. 4 is a reference diagram for describing the relative position and the attitude of the host vehicle M with respect to a traveling lane L1. The host vehicle position recognizer 120 recognizes a plurality of lane markings $LM_1$, $LM_2$, and $LM_3$, for example, and recognizes an area between the lane markings $LM_1$ and $LM_2$ closest to the host vehicle M as a traveling lane (a host lane) L1 of the host vehicle M. The host vehicle position recognizer 120 recognizes a deviation OS represented by a distance between a reference point (for example, the center of gravity) of the host vehicle M and a traveling lane center CL and an angle θ which is the magnitude of an area sandwiched between a straight line indicating a traveling direction of the host vehicle M and the traveling lane center CL as the relative position and the attitude of the host vehicle M with respect to the traveling lane L1, respectively. Instead of this, the host vehicle position recognizer 120 may recognize the position or the like of the reference point of the host vehicle M in relation to either lateral end of the traveling lane L1 as the relative position of the host vehicle M with respect to the traveling lane.

The host vehicle position recognizer 120 may recognize the relative distance and the relative speed of the host vehicle M with respect to the neighboring vehicle or the like on the basis of the recognized position and speed of the host vehicle M and the position and the speed of the neighboring vehicle or the like recognized by the outside world recognizer 110.

The host vehicle position recognizer 120 may recognize an adjacent lane adjacent to a host lane, for example. The adjacent lane is a lane in which the traveling direction is the same as a traveling direction of the host lane among adjacent lanes and does not include an opposite lane. For example, the host vehicle position recognizer 120 may recognize an area between lane markings of the host lane and lane markings close to the host vehicle M, next to the lane markings of the host lane as an adjacent lane. In the example of FIG. 4, the host vehicle position recognizer 120 recognizes an area between the lane markings $LM_2$ of the host lane and the lane markings $LM_3$ close to the host vehicle M next to the lane markings $LM_2$ as a right adjacent lane L2. Here, the host vehicle position recognizer 120 may determine whether the recognized lane markings are a center line and may determine whether the adjacent lane is an opposite lane.

The host vehicle position recognizer 120 may determine whether an area adjacent to the host lane is a lane, for example. For example, when lane markings on an outer side of the host lane are not recognized among a plurality of recognized lane markings, the host vehicle position recognizer 120 recognizes that an area in which lane markings are not recognized is not a lane. In the example of FIG. 4, although a plurality of lane markings $LM_1$, $LM_2$, and $LM_3$ are recognized, since no lane marking is recognized in the outer side of the lane marking $LM_1$, the host vehicle position recognizer 120 determines that no lane is present on the left side of the host lane. On the other hand, since the lane marking $LM_3$ is recognized in the outer side of the lane marking $LM_2$, the host vehicle position recognizer 120 determines that a lane is present on the right side of the host lane. Such determination may be performed by referring to the map information 54.

Figure 5:
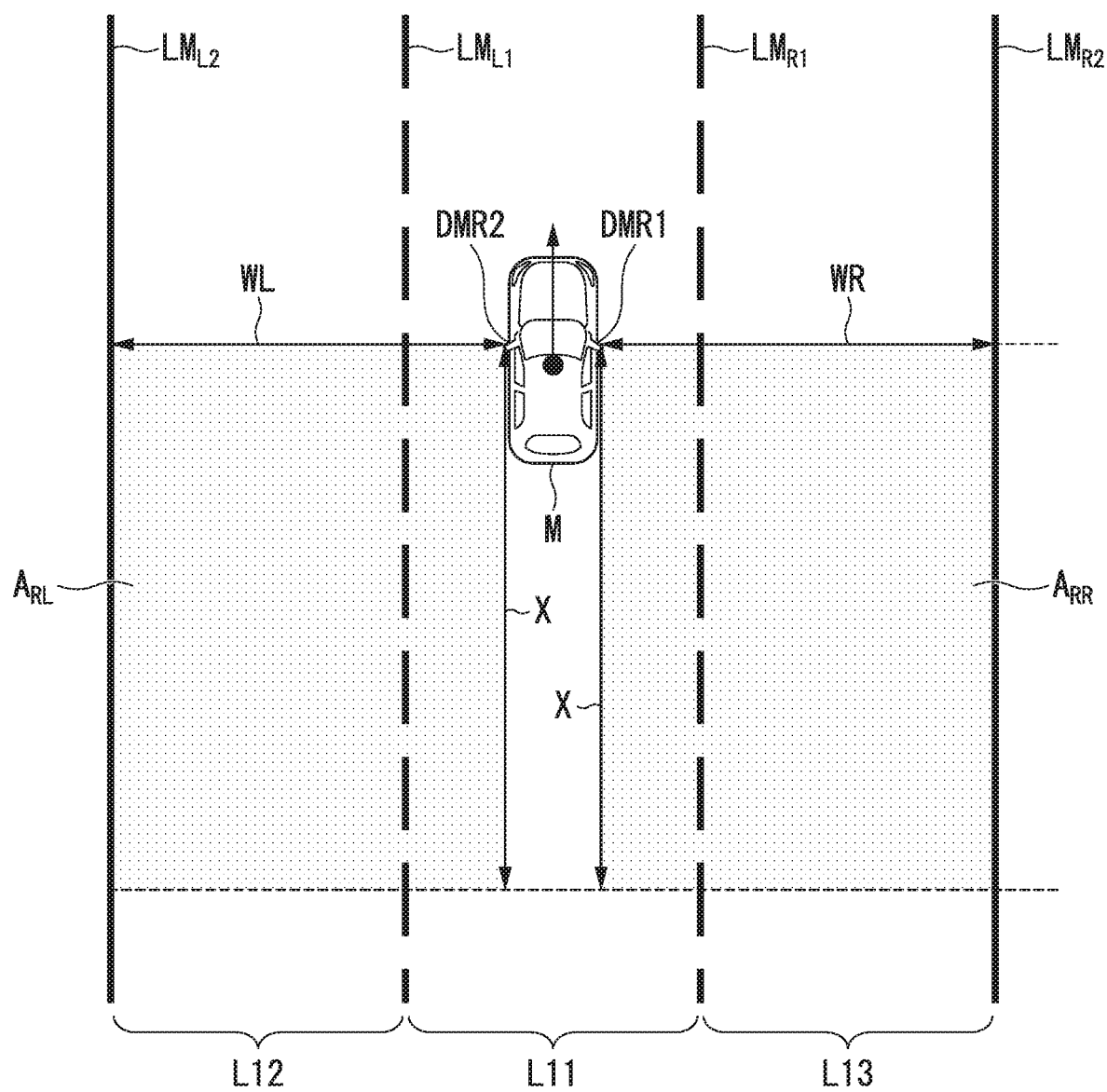
FIG. 5 is a diagram for describing a target area of a host vehicle.

When the neighboring vehicle or the like recognized by the outside world recognizer 110 is present in a target area of the host vehicle M, the apparatus operation controller 130 causes an onboard apparatus to perform a predetermined operation. The target area is a predetermined area in which the host vehicle M is likely to come in contact another vehicle traveling in the target area and is an area including areas on the left and right sides and the rear side of the host vehicle M. FIG. 5 is a diagram for describing the target area of the host vehicle M. In FIG. 5, L11 is a host lane of the host vehicle M, L12 is an adjacent lane to the left of the host lane L11 in the traveling direction of the host vehicle M, and L13 is a right adjacent lane of the host lane L11 in the traveling direction of the host vehicle M. A contact possibility determination unit 133 sets a left-rear-side area $A_{RL}$ and a right-rear-side area $A_{RR}$ in the host lane L11 and the adjacent lanes L12 and L13 as target areas.

The left-rear-side area $A_{RL}$ is a rectangular area defined by a width WL extending from the left-side door mirror DMR2 of the host vehicle M to a lane marking $LM_{L2}$ away from the host vehicle M on the lane L2 in a direction perpendicular to the traveling direction of the host vehicle M and a predetermined length X1 from the door mirror DMR2 toward the rear side of the host vehicle M, for example. The right-rear-side area $A_{RR}$ is a rectangular area defined by a width WR extended from the right-side door mirror DMR1 of the host vehicle M to a lane marking $LM_{R2}$ distant from the host vehicle M on the lane L3 in a direction perpendicular to the traveling direction of the host vehicle M and a predetermined length X1 from the door mirror DMR1 toward the rear side of the host vehicle M, for example. The target area is not limited thereto, and may be an area on the side in front of the host vehicle M and may be a combination of the front-side area and the rear-side area. The width and the length of the target area may be set arbitrarily.

The predetermined operation to be performed by an onboard apparatus includes at least one of an operation (a notification operation) of notifying an occupant of the likelihood of contact between the host vehicle M and an object and an operation (a contact avoiding operation) of avoiding contact between the host vehicle M and an object, for example. The notification operation includes an operation of displaying the warning image 60a on the door mirror DMR, an operation of outputting an alarm from the speaker 24, and an operation of displaying a message image on the display 22, for example. The contact avoiding operation is an operation of controlling the operations of the running drive force output device 200, the brake device 210, and the steering device 220 to avoid contact between the host vehicle M and the neighboring vehicle or the like. Examples of the onboard apparatus include the HMI 20, the driving operator 40, the BSI indicator 60, the running drive force output device 200, the brake device 210, and the steering device 220. Some of the predetermined operations may be restricted by a user's selection. For example, all notification operations may be restricted and only the contact avoiding operation may be performed.

The HMI controller 140 outputs the content, the result, and the like of the processing performed by the vehicle control device 100 from the display 22, the speaker 24, and the like of the HMI 20. The HMI controller 140 acquires the content and the like of an occupant's operation received via the display 22 and various buttons or the HMI 20.

[Configuration of Device Operation Controller 130]

Figure 6:
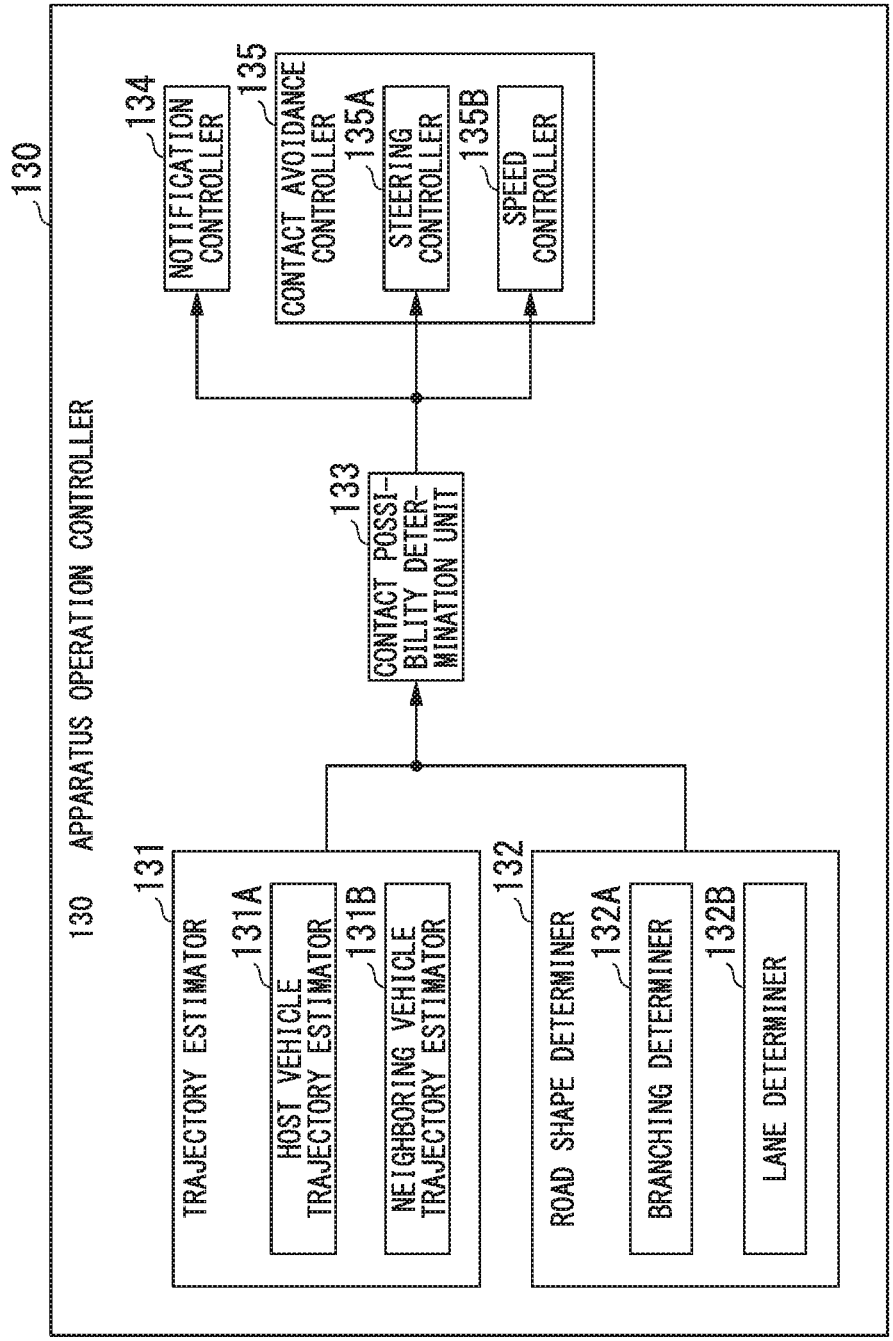
FIG. 6 is a diagram illustrating an example of a functional configuration of an apparatus operation controller.

Next, an example of a functional configuration of the apparatus operation controller 130 will be described in detail. FIG. 6 is a diagram illustrating an example of a functional configuration of the apparatus operation controller 130. The apparatus operation controller 130 includes a trajectory estimator 131, a road shape determiner 132, a contact possibility determination unit 133, a notification controller 134, and a contact avoidance controller 135, for example.

The trajectory estimator 131 includes a host vehicle trajectory estimator 131A and a neighboring vehicle trajectory estimator 131B, for example.

The host vehicle trajectory estimator 131A estimates a future traveling trajectory of the host vehicle M from the state of the host vehicle M. For example, the host vehicle trajectory estimator 131A estimates the future traveling trajectory of the host vehicle M on the basis of the position of the host vehicle M recognized by the host vehicle position recognizer 120, the speed, the acceleration, and the yaw rate of the host vehicle M obtained by the vehicle sensor 30, a steering angle of a steering wheel, a depression amount of an acceleration pedal and a brake pedal, a road shape, and the like. The host vehicle trajectory estimator 131A estimates a lane along which the host vehicle M is traveling or a lane along which the host vehicle M may travel in the future on the basis of the traveling trajectory of the host vehicle M and the determination result obtained by the road shape determiner 132.

The neighboring vehicle trajectory estimator 131B acquires the position and the speed of each of the neighboring vehicles or the like recognized by the outside world recognizer 110 and estimates the future traveling trajectory of each of the neighboring vehicles or the like on the basis of the acquired position and speed. The neighboring vehicle trajectory estimator 131B estimates a lane along which the neighboring vehicle or the like is traveling or a lane along which the neighboring vehicle or the like may travel in the future on the basis of the traveling trajectory of the neighboring vehicle or the like and the determination result obtained by the road shape determiner 132.

The trajectory estimator 131 derives parameters related to the behavior of the host vehicle M on the basis of input information, the estimated trajectory, and the like. For example, the trajectory estimator 131 derives a distance d between the host vehicle M and a lane marking on the basis of the position of the host vehicle M recognized by the host vehicle position recognizer 120. The trajectory estimator 131 derives a lateral speed v1 of the host vehicle M, a relative speed v2 between the host vehicle M and the other vehicle, and a distance x between the host vehicle M and the other vehicle on the basis of the detection results obtained by the vehicle sensor 30. The trajectory estimator 131 also derives a collision margin time (time to collision: TTC) which is a predicted time until contact between the other vehicle and the host vehicle M occurs and a lane deviation estimation time (time to lane crossing: TTLC) which is an estimation time until the host vehicle M crosses a lane marking on the basis of deriving results. TTC is calculated by dividing a relative distance by a relative speed, for example (x/v2). TTLC is calculated by dividing the distance to a lane marking by a lateral speed, for example (d/v1).

The road shape determiner 132 includes a branching determiner 132A and a lane determiner 132B, for example.

The branching determiner 132A determines whether the host vehicle M enters or has entered a branching point and outputs the determination result to the contact possibility determination unit 133. The branching point is a place connected to a branching road that satisfies predetermined conditions and includes a branching point at which a vehicle enters a parking area of an expressway, a service area, or an interchange, a branching point at which a vehicle enters a tollgate of an expressway or other toll roads, and the like, for example. The branching point is not limited thereto but may be a partial branching point on a public road. The branching point that satisfies predetermined conditions includes a place in which a branching road extends from a main lane in a direction different from a traveling direction of the main lane, a place in which a portion of a main lane is connected to a branching road, and the like, for example.

For example, the branching determiner 132A determines whether the present position of the host vehicle M enters or has entered a branching point on the basis of the position of the host vehicle M specified by the host vehicle position recognizer 120 by referring to the map information 54. The branching determiner 132A may determine whether the present position of the host vehicle M enters or has entered a branching point on the basis of the output of the camera 10. The branching determiner 132A may determine whether the present position of the host vehicle M enters or has entered a branching point on the basis of the presence of an operation of a winker, a change in the traveling speed of the host vehicle M, a steering angle or a steering torque of the steering wheel, and the like. A specific example will be described below.

For example, the branching determiner 132A determines whether the host vehicle approaches a branching point on the basis of the map information and the position information of the host vehicle M. Specifically, the branching determiner 132A determines whether the position of the host vehicle M specified by the host vehicle position recognizer 120 enters or has entered a predetermined branching point on a map by referring to the map information 54 of the navigation device 50. The branching determiner 132A may determine whether the host vehicle M enters or has entered a predetermined branching point on the basis of a route (including a route received from an external server) set by the navigation device 50. The branching determiner 132A may compare the position information of a predetermined branching point registered in advance in a database of an external server and the position information of the host vehicle M to determine whether the host vehicle M enters or has entered the predetermined branching point. The branching determiner 132A may determine whether the host vehicle M on a map is traveling on a general road or is traveling on an expressway constructed above a general road by referring to the traveling speed of the host vehicle M. In this way, even when a general road overlaps an expressway three-dimensionally, it is possible to determine whether the host vehicle M enters or has entered a branching point set on an expressway. Therefore, it is possible to determine entry to a predetermined branching point with high accuracy.

The branching determiner 132A may determine that the host vehicle M enters or has entered a branching point when a predetermined mark was detected from an image input from the camera 10 that captures an image of the side in front of the host vehicle M, and then, a behavior of the host vehicle M moving toward the predetermined mark is detected. The predetermined mark includes a signboard, a road sign, and the like indicating the branching point, for example. The branching determiner 132A may determine that the host vehicle M enters or has entered the branching point from the shape of a lane marking included in the captured image. In this way, it is possible to determine entry to the predetermined branching point with high accuracy.

When determining whether the host vehicle M enters or has entered the branching point, the branching determiner 132A may determine whether a behavior of the host vehicle M moving toward the branching lane is detected and determine whether the host vehicle M is in a decelerating state of a predetermined level or higher. When a behavior of the host vehicle M moving toward the branching lane is detected and it is determined that the host vehicle M is in a decelerating state of a predetermined level or higher, it may be determined that the host vehicle M enters or has entered the branching point. For example, the branching determiner 132A may determine whether a behavior of the host vehicle M moving toward the branching lane is detected on the basis of the presence of an operation of a winker, a steering angle or a steering torque of the steering wheel, and the like. When the steering wheel is turned abruptly, this behavior is highly likely to be a behavior for avoiding contact with a vehicle on the side in front. In this case, the branching determiner 132A does not determine that a behavior of the host vehicle M moving toward the branching lane is detected. The branching determiner 132A may determine whether a behavior of the host vehicle M moving toward the branching lane is detected on the basis of parameters related to the behavior of the host vehicle M derived by the trajectory estimator 131 or the like, for example. For example, the branching determiner 132A may determine that a behavior of the host vehicle M moving toward the branching lane is detected when a lateral movement such that the host vehicle changes lane is detected on the basis of the derived parameters related to the behavior of the host vehicle M. The branching determiner 132A may determine whether the host vehicle M is in a decelerating state of a predetermined level or higher on the basis of the history of the traveling speed of the host vehicle M. For example, the branching determiner 132A determines that the host vehicle M is in a decelerating state of a predetermined level or higher when the traveling speed or a deceleration amount of the host vehicle M is equal to or smaller than a predetermined threshold. The deceleration amount is a difference between the present speed and a speed predetermined period before, of the decelerating host vehicle M.

The branching determiner 132A may determine whether the host vehicle M is traveling on an expressway on the basis of the history of the traveling speed of the host vehicle M. For example, the branching determiner 132A determines that the host vehicle M is traveling on an expressway when a period in which the host vehicle M is traveling at a speed of 80 km/h or higher is equal to or longer than a predetermined period by referring to the past record of the traveling speed of the host vehicle M measured at predetermined intervals. When it is determined that the host vehicle M is traveling on an expressway, the branching determiner 132A may further determine whether the host vehicle M is in a decelerating state of a predetermined level or higher and a lateral movement such that the host vehicle M changes lane is detected. When the host vehicle M is in a decelerating state of a predetermined level or higher and a lateral movement such that the host vehicle M changes lane is detected, the branching determiner 132A may determine that the host vehicle M enters or has entered the predetermined branching point. In this way, since the branching determiner 132A can determine whether the host vehicle M traveling on an expressway enters a branching point such as a parking area, a service area, or an interchange without referring to the map information, it is possible to determine entry to the predetermined branching point with a simple configuration.

The lane determiner 132B determines the position of a lane on a road along which the host vehicle M travels on the basis of the position of the host vehicle M recognized by the host vehicle position recognizer 120. The position of a lane includes information indicating the order of a lane from the left (or the right) side among a plurality of lanes on a road. The lane determiner 132B may determine the position of a lane on a road along which the host vehicle M is traveling on the basis of the position of the host vehicle M recognized by the host vehicle position recognizer 120 by referring to the map information 54 of the navigation device 50. The lane determiner 132B may determine whether the number of lanes along which the host vehicle M is traveling or may travel in the future is plural.

The contact possibility determination unit 133 determines the likelihood of contact between the host vehicle M and the neighboring vehicle or the like. For example, the contact possibility determination unit 133 determines whether the neighboring vehicle or the like is recognized in a target area on the basis of the recognition result obtained by the outside world recognizer 110 and the like. When the distance between the host vehicle M and the neighboring vehicle or the like is equal to or smaller than a predetermined threshold X that defines a target area, the contact possibility determination unit 133 determines that the neighboring vehicle or the like is recognized in the target area and determines that there is a likelihood of contact between the host vehicle M and the neighboring vehicle or the like. In this way, it is possible to determine the likelihood of contact with the other vehicle traveling in parallel with the host vehicle M at a close range.

The contact possibility determination unit 133 may compare the TTC between the host vehicle M and the neighboring vehicle or the like recognized by the outside world recognizer 110 and the like with a predetermined threshold and may determine that there is a likelihood of contact between the host vehicle M and the neighboring vehicle or the like when the TTC is equal to or smaller than the threshold. In this way, it is possible to determine the likelihood of contact with the other vehicle or the like that passes the host vehicle M at a high speed from the rear side.

Figure 7:
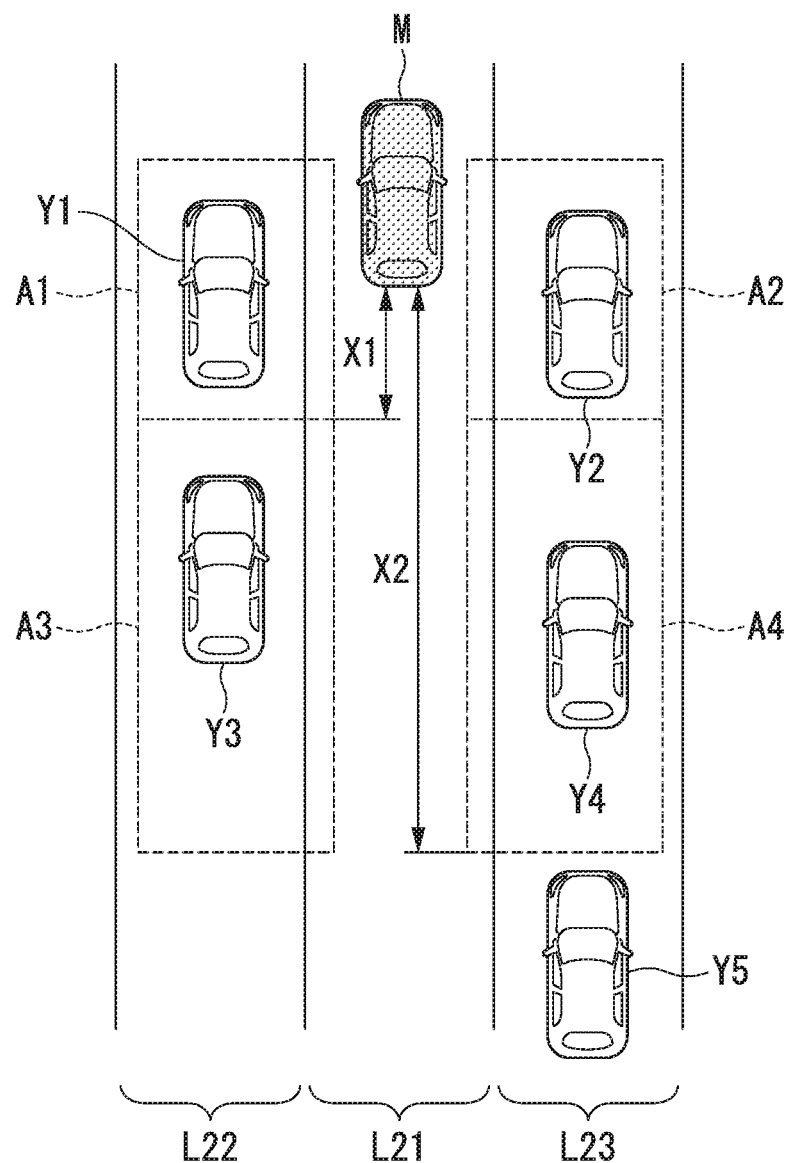
FIG. 7 is a diagram illustrating an example in which a host vehicle travels on a lane at the center of three lanes.

Here, an example of the neighboring vehicle or the like which the contact possibility determination unit 133 determines that the neighboring vehicle or the like may make contact with the host vehicle M will be described by referring to FIGS. 7 and 8. FIG. 7 is a diagram illustrating an example in which the host vehicle M is traveling along a lane L21 at the center among three lanes including lanes L21, L22, and L23. The target area includes target areas A1 to A4. The target area A1 is a left-side area, the target area A2 is a right-side area, the target area A3 is a left-rear-side area, and the target area A4 is a left-rear-side area. The left and right sides are the directions in relation to the traveling direction of the host vehicle M. The target areas A1 and A2 are areas in which the distance to the host vehicle M is equal to or smaller than X1. The target areas A3 and A4 are areas in which the distance to the host vehicle M is larger than X1 and equal to or smaller than X2.

The contact possibility determination unit 133 determines that other vehicles Y1 to Y4 traveling in the target areas A1 to A4 are neighboring vehicles or the like that may make contact with the host vehicle M. Even when the other vehicle Y5 is traveling in an area other than the target areas A1 to A4 among adjacent lanes and the TTC between the other vehicle Y5 and the host vehicle M is equal to or smaller than a threshold, the contact possibility determination unit 133 determines that the other vehicle Y5 is a neighboring vehicle or the like that may make contact with the host vehicle M. A neighboring vehicle that may make contact with the host vehicle M like these other vehicles Y1 to Y5 will be referred to as a target other vehicle.

Figure 8:
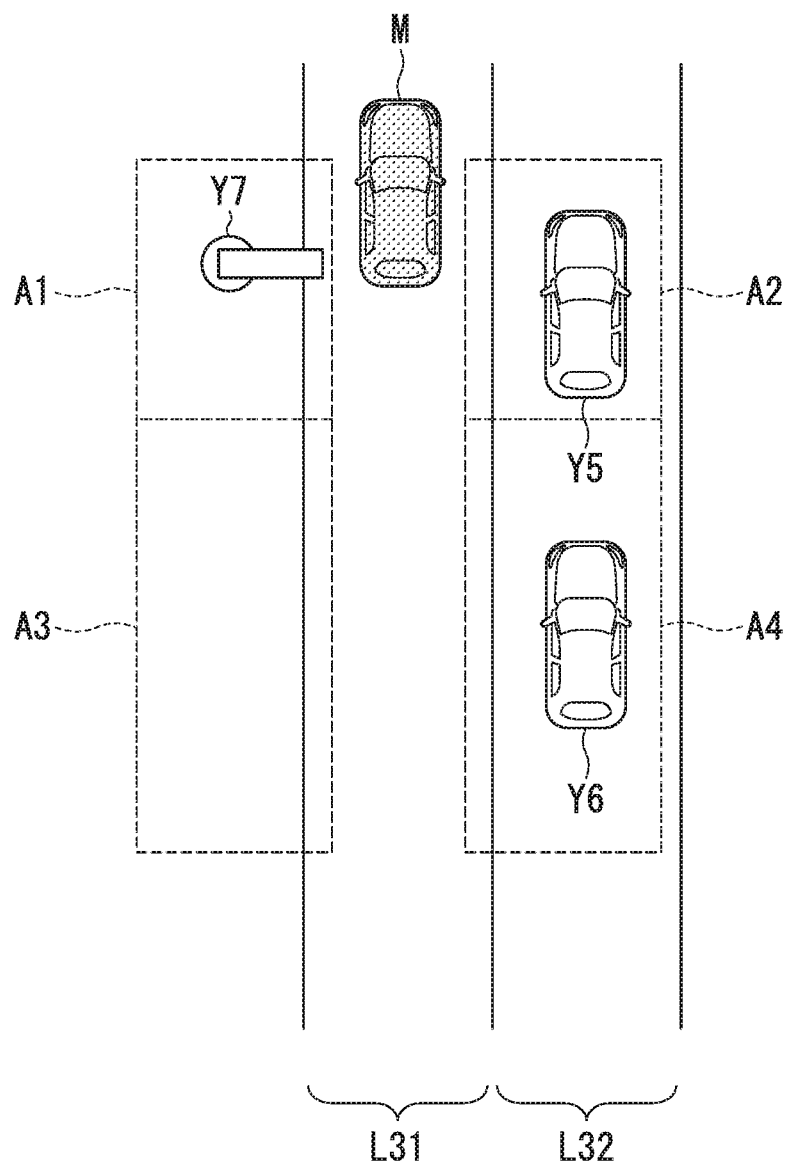
FIG. 8 is a diagram illustrating an example in which a host vehicle is traveling on a lane further from a center line of two lanes.

FIG. 8 is a diagram illustrating an example in which the host vehicle M is traveling along a lane L31 further from a center line CL of two lanes including lanes L31 and L32. In FIG. 8, the contact possibility determination unit 133 determines that other vehicles Y5 and Y6 traveling in the target areas A2 and A4 are neighboring vehicles or the like that may make contact with the host vehicle M and determines that a mark Y7 present in the target area A1 is a neighboring vehicle or the like that may make contact with the host vehicle M.

The contact possibility determination unit 133 determines whether the neighboring vehicle or the like recognized by the outside world recognizer 110 is a vehicle on the basis of the determination result obtained by the lane determiner 132B. For example, as illustrated in FIG. 7, when the determination result obtained by the lane determiner 132B indicates that the host vehicle M is traveling along the lane L21 at the center of three lanes, the contact possibility determination unit 133 determines that the neighboring vehicle or the like recognized in adjacent lanes L22 and L23 is a vehicle. On the other hand, as illustrated in FIG. 8, when the determination result obtained by the lane determiner 132B indicates that the host vehicle M is traveling along the lane L31 further from the center line CL of two lanes, the contact possibility determination unit 133 determines that the neighboring vehicle or the like recognized in the adjacent lane L32 is a vehicle and determines that the neighboring vehicle or the like recognized in an area on the left side of the lane L31 is not a vehicle. That is, the contact possibility determination unit 133 determines that the neighboring vehicle or the like (for example, the mark Y7 illustrated in FIG. 8) recognized by the outside world recognizer 110 from an area which is not determined to be a lane by the lane determiner 132B is an object other than a vehicle.

The contact possibility determination unit 133 may determine whether there is a likelihood of contact between the host vehicle M and the neighboring vehicle or the like on the basis of the traveling trajectory of the host vehicle M estimated by the host vehicle trajectory estimator 131A and the traveling trajectory of the neighboring vehicle or the like estimated by the neighboring vehicle trajectory estimator 131B.

Here, the contact possibility determination unit 133 will be described. When the branching determiner 132A determines that the host vehicle M does not enter the branching point and it is determined that there is a likelihood of contact between the host vehicle M and the neighboring vehicle or the like, the contact possibility determination unit 133 causes an onboard apparatus to perform a predetermined operation. In the following description, the predetermined operation will be referred to as normal driving support control. On the other hand, when the branching determiner 132A determines that the host vehicle M enters or has entered the branching point and it is determined that there is a likelihood of contact between the host vehicle M and the neighboring vehicle or the like, the contact possibility determination unit 133 executes a process (hereinafter referred to as branching driving support control) in which some processes of the normal driving support control are restricted. Hereinafter, a specific example will be described. When the branching determiner 132A determines that the host vehicle M enters or has entered the branching point and it is determined that there is a likelihood of contact between the host vehicle M and the neighboring vehicle or the like, for example, the contact possibility determination unit 133 changes the content of a notification output by the notification controller 134 to lower the level of the predetermined operation (that is, the predetermined operation is prevented; the same hereinafter). Specifically, the contact possibility determination unit 133 restricts the warning image 60a appearing on the mirror surface of the door mirror DMR (so that the warning image 60a does not appear), changes a display mode of the warning image 60a from blinking to lighting, restricts the output of an alarm from the speaker 24 (so that the alarm is not output), and restricts a message image displayed on the display 22 (so that the message image is not displayed). That is, lowering the level of the predetermined operation includes preventing execution of some operations included in the predetermined operation (so that some operations are restricted).

The contact possibility determination unit 133 may lower the level of the predetermined operation by changing (for example, decreasing) the threshold of the TTC. Specifically, the contact possibility determination unit 133 determines whether the TTC between the host vehicle M and the neighboring vehicle or the like recognized by the outside world recognizer 110 and the like is equal to or smaller than the threshold. When it is determined that the TTC is equal to or smaller than the threshold, the contact possibility determination unit 133 causes the onboard apparatus to perform the predetermined operation and changes the threshold of the TTC set for a branching case to a value smaller than the threshold for a normal case. The branching case includes a case in which the branching determiner 132A determines that the host vehicle M enters or has entered the branching point. The process of changing the threshold may be a process of rewriting the threshold and a process of acquiring a different reference value from a different storage area. For example, when this case does not correspond to the branching case (for example, the host vehicle M does not enter the branching point), the contact possibility determination unit 133 performs a predetermined operation of notifying the neighboring vehicle or the like for which the TTC is equal to or smaller than a threshold TTC1 of the likelihood of contact. On the other hand, when this case corresponds to the branching case (for example, the host vehicle M enters or has entered the branching point), the contact possibility determination unit 133 performs a predetermined operation with respect to the neighboring vehicle or the like in which the TTC is equal to or smaller than a threshold TTC2 smaller than the threshold TTC1. In this way, the predetermined operation is restricted with respect to the neighboring vehicle or the like in which the TTC is between the threshold TTC1 and the threshold TTC2.

The contact possibility determination unit 133 lowers the level of the predetermined operation executed when this case corresponds to a lowering case as compared to the level of the predetermined operation executed when this case corresponds to a non-lowering case. The non-lowering case includes a case in which a target other vehicle is recognized in a lane on a near side when seen from a branching lane extending from a branching point, for example. The non-lowering case includes a case in which a target other vehicle or the like in a target area recognized by the outside world recognizer 110 is recognized in a lane on a distant side when seen from a branching lane extending from the branching point among lanes adjacent to the host lane along which the host vehicle M is traveling. In this way, the contact possibility determination unit 133 can perform a predetermined operation of notifying the neighboring vehicle or the like on the traveling direction side of the host vehicle M of the likelihood of contact and can prevent the predetermined operation with respect to the neighboring vehicle or the like on the opposite side in the traveling direction of the host vehicle M since it is less necessary to pay attention to the neighboring vehicle or the like.

The contact possibility determination unit 133 determines whether the neighboring vehicle or the like recognized by the outside world recognizer 110 and the like is recognized in an area to the side and an area behind the host vehicle M among the target areas. When it is determined that the neighboring vehicle or the like is recognized in a rear-side area of the host vehicle and that the host vehicle M enters or has entered a predetermined branching point, the contact possibility determination unit 133 prevent the predetermined operation according to the TTC between the host vehicle M and the neighboring vehicle or the like. In this way, the contact possibility determination unit 133 can prevent the predetermined operation by performing a predetermined operation of notifying the neighboring vehicle or the like recognized in an area to the side of the host vehicle M of the likelihood of contact and performing the predetermined operation when necessary depending on the TTC with respect to the neighboring vehicle or the like on the rear-side area of the host vehicle M since it is less necessary to pay attention to the neighboring vehicle or the like.

When the neighboring vehicle or the like recognized in the target area is present on a branching lane extending from the branching point, the contact possibility determination unit 133 may not prevent the predetermined operation with respect to the neighboring vehicle or the like. Since an operation of entering a branching lane to a parking area on an expressway, a service area, an interchange, or the like is a driving operation in the middle of traveling at high speed, the sense of speed of a driver is different from the sense of speed on a general road and an attention needs to be paid. Due to this, it is necessary to call a driver's attention strongly with respect to a neighboring vehicle or the like that merges in a branching lane.

The notification controller 134 causes an onboard apparatus to output a predetermined notification on the basis of the determination result obtained by the contact possibility determination unit 133, for example. The predetermined notification includes displaying the warning image 60a on the mirror surface of the door mirror DMR, outputting an alarm sound from a speaker, and displaying a message or an image for attracting attention on the display 22, for example. The details of the function of the notification controller 134 will be described later.

The contact avoidance controller 135 performs a driving support operation of controlling the steering and the speed of the host vehicle M to avoid contact with a neighboring vehicle or the like on the basis of the determination results obtained by the contact possibility determination unit 133. For example, when it is estimated that there is a likelihood of contact with a neighboring vehicle or the like traveling a destination lane when the host vehicle M changes lane, the contact avoidance controller 135 performs a contact avoidance driving support operation by performing lane deviation suppression control of controlling steering so that the host vehicle M does not deviate from the host lane. The lane deviation suppression control may involve controlling the speed of the host vehicle M as well as controlling steering.

The contact avoidance controller 135 includes a steering controller 135A and a speed controller 135B, for example.

When a neighboring vehicle or the like estimated by the contact possibility determination unit 133 to have possibility to make contact with the host vehicle M, the steering controller 135A adjusts a control amount of the steering angle and the steering torque of the steering wheel so as to avoid contact between the host vehicle M and the neighboring vehicle or the like and outputs the adjusted control amount to the steering device 220.

When a neighboring vehicle or the like estimated by the contact possibility determination unit 133 to have possibility to make contact with the host vehicle M, the speed controller 135B adjusts a depression amount of an acceleration pedal or a brake pedal so as to avoid contact between the host vehicle M and the neighboring vehicle or the like and outputs the adjusted control amount to the running drive force output device 200 and the brake device 210.

[Example of Driving Support Control Execution Scene]

Hereinafter, examples of various scenes in which driving support control is executed by the vehicle control device 100 will be described.

<Example of Normal Driving Support Control Execution Scene>

First, the control content of driving support control in a state in which a neighboring vehicle Y11 on an adjacent lane approaches the host vehicle M from the rear side will be described as an example of a scene in which normal driving support control is executed.

Figure 9:
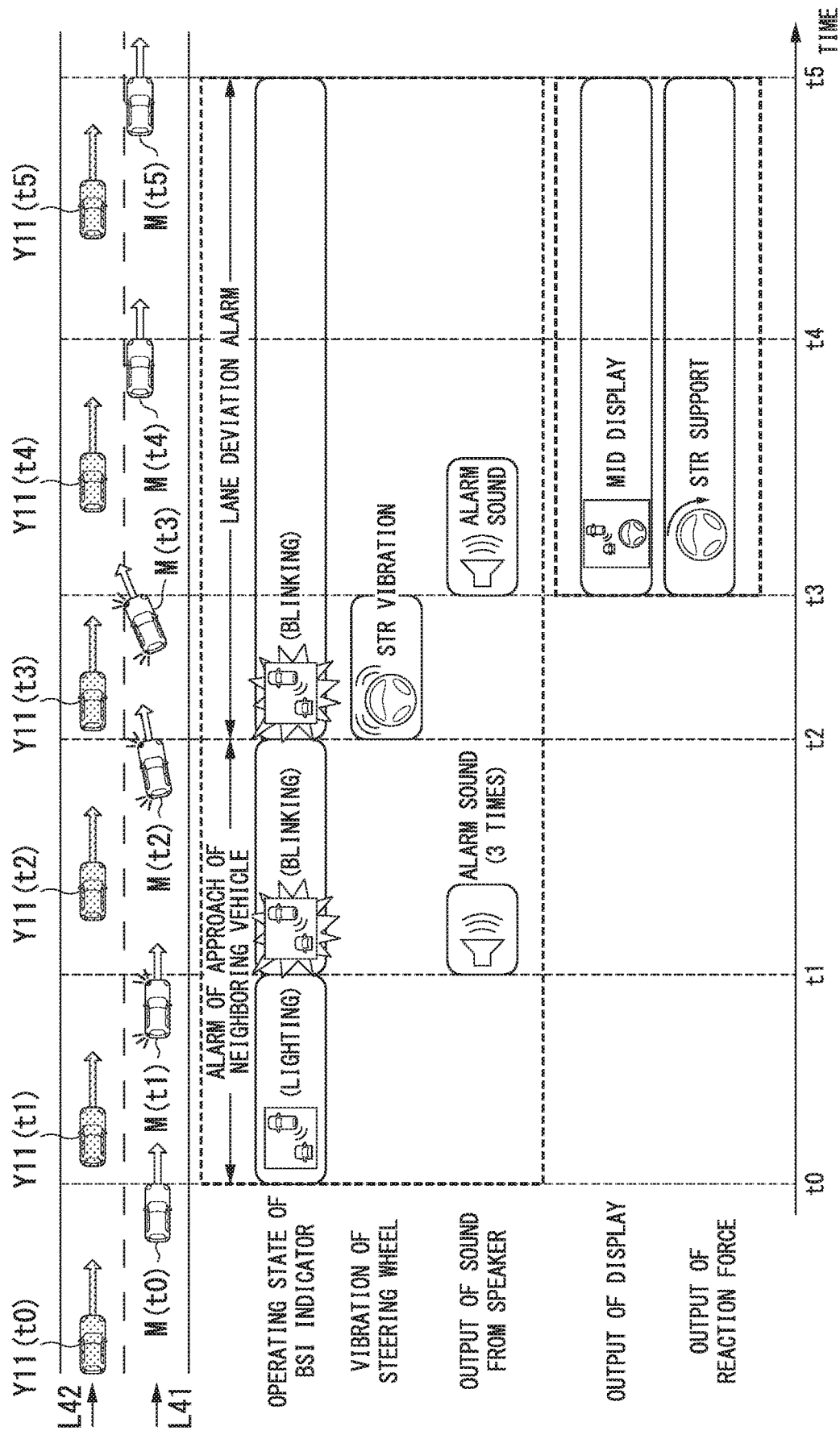
FIG. 9 is a reference diagram for describing normal driving support control.

FIG. 9 is a reference diagram for describing normal driving support control. In this example, a scene in which the other vehicle Y11 on an adjacent lane approaches the host vehicle M from the rear side will be described. In FIG. 9, the traveling positions at time points t0 to t5 of the host vehicle M traveling on a lane L41 and the other vehicle Y11 traveling on a lane L42 and the control content of the onboard apparatus of the host vehicle M at respective time points are illustrated.

For example, at time point t0, the other vehicle Y11 is recognized in the target area A3 on the left-rear side of the host vehicle M. In this state, the notification controller 134 operates the BSI indicator 60 to display the warning image 60a on a portion of the mirror surface of the left-side door mirror DMR2 as a first warning (in the drawing, indicated by lighting). In this way, an occupant of the host vehicle M can be informed of the fact that the other vehicle Y11 is approaching from the left-rear side.

Time point t1 indicates a time point at which an occupant operates a winker lever which is an example of a driving operator to change lane and the winker of the host vehicle M is operated. In this case, it is assumed that the occupant of the host vehicle M has issued a lane change instruction without recognizing the presence of the other vehicle Y11. Therefore, even when the host vehicle M has not approached a lane marking, the notification controller 134 controls the BSI indicator 60 to change the display mode of the warning image 60a displayed on the mirror surface of the left-side door mirror DMR2 from lighting to blinking at time point t1 as a second alarm (in the drawing, indicated by blinking). The notification controller 134 may cause the speaker 24 to output an alarm sound predetermined number of times (three times in the illustrated example) at a timing at which the warning image 60a blinks as the second alarm. In this way, it is possible to call stronger attention to the occupant having issued a lane change instruction as compared to before the winker is operated.

Figure 10:
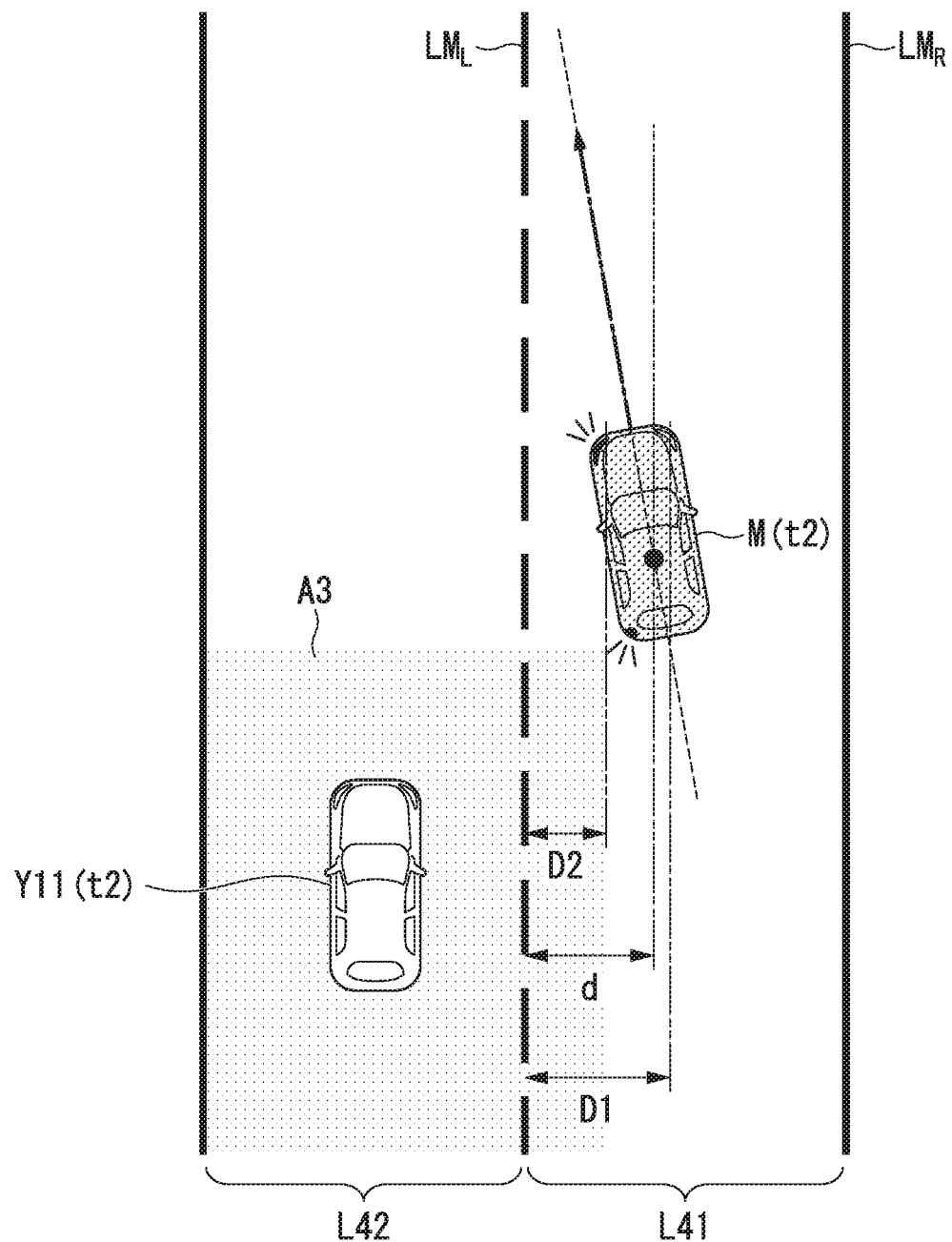
FIG. 10 is a diagram for describing how a host vehicle M travels at time point t2.

Time point t2 indicates a time point at which an occupant operates the steering wheel which is an example of a driving operator to change lane to move the host vehicle M from the lane L41 to the lane L42. Here, FIG. 10 is a diagram for describing how the host vehicle M travels at time point t2. In the drawing, $LM_L$ indicates a lane marking on the left side in the traveling direction among two lane markings that define the host lane L41 and $LM_R$ indicates a lane marking on the right side in the traveling direction among the two lane markings that define the host lane L41. The illustrated example indicates that the other vehicle Y11 traveling on the left-side lane L42 is present within a predetermined distance from the host vehicle M.

For example, the contact possibility determination unit 133 determines whether the host vehicle M approaches the lane marking $LM_L$ until the distance d between the center of gravity of the host vehicle M and the lane marking $LM_L$ is equal to or smaller than a threshold D1. In this way, it is possible to determine the likelihood of contact with the other vehicle even when the host vehicle M approaches the adjacent lane at a low speed. Instead of this, the contact possibility determination unit 133 may determine whether TTLC is equal to or smaller than a predetermined threshold TTLC1. In this way, it is possible to determine the likelihood of contact with the other vehicle even when the host vehicle M approaches the adjacent lane at a high speed.

The contact possibility determination unit 133 controls the notification controller 134 to output a third alarm when it is determined that the host vehicle M has approached the lane marking $LM_L$ until the distance d is equal to or smaller than the threshold D1 and TTLC is equal to or smaller than the threshold TTLC1.

For example, the contact possibility determination unit 133 may operate a vibrator installed in the steering wheel to vibrate the steering wheel as the third alarm in a state in which the warning image 60a displayed on the mirror surface of the left-side door mirror DMR2 is blinking. In this way, it is possible to urge the occupant to operate the steering wheel to travel along the center of a lane. When the host vehicle M approaches closer to the adjacent lane L42, it is possible to notify the occupant of the fact that the contact avoidance control of the contact avoidance controller 135 is executed.

Time point t3 indicates a time point at which there is no operation of the occupant with respect to the steering wheel after the steering wheel was vibrated (the steering angle and the steering torque are smaller than a threshold), and the host vehicle M has approached further closer to the lane marking $LM_L$ until the distance d between the host vehicle M and the lane marking $LM_L$ is equal to or smaller than a threshold D2 smaller than the threshold D1. Time point t3 may be a time point at which a predetermined period has elapsed after the steering wheel was vibrated. In this case, the contact possibility determination unit 133 controls the contact avoidance controller 135 to execute contact avoidance control. In this way, lane deviation suppression control is realized so that vibration of the steering wheel stops and the host vehicle M returns to the center of the host lane (in the drawing, indicated by STR support).

The threshold D2 is a predetermined distance in a vehicle width direction measured toward the center of a lane from a lane marking that defines the host lane similarly to the threshold D1. For example, the threshold D2 is set to a distance in which a portion of the body of the host vehicle M crosses a lane marking when the host vehicle M has approached the lane marking when seen from the above until the distance d is equal to or smaller than the threshold D2. The threshold TTLC2 may be set to a period shorter than the threshold TTLC1, for example.

At time point t3, the notification controller 134 may cause the speaker 24 to output an alarm sound as a fourth alarm and may display an image indicating that the host vehicle M is approaching the other vehicle Y11 on the display 22 (in the drawing, indicated by MID (multi-information display) display).

Time point t4 indicates a time point at which the host vehicle M returns to the host lane L41 by the contact avoidance control. In such a case, at a time point at which a predetermined period has elapsed after the host vehicle M returns to the host lane or a time point at which the host vehicle M has traveled predetermined distance (time point t5 in the drawing), the notification controller 134 stops blinking of the image 60a of the BSI indicator 60 and ends notification control of MID display. The contact avoidance controller 135 ends contact avoidance control such as lane deviation suppression control.

First Example of Branching Driving Support Control Execution Scene

Figure 11:
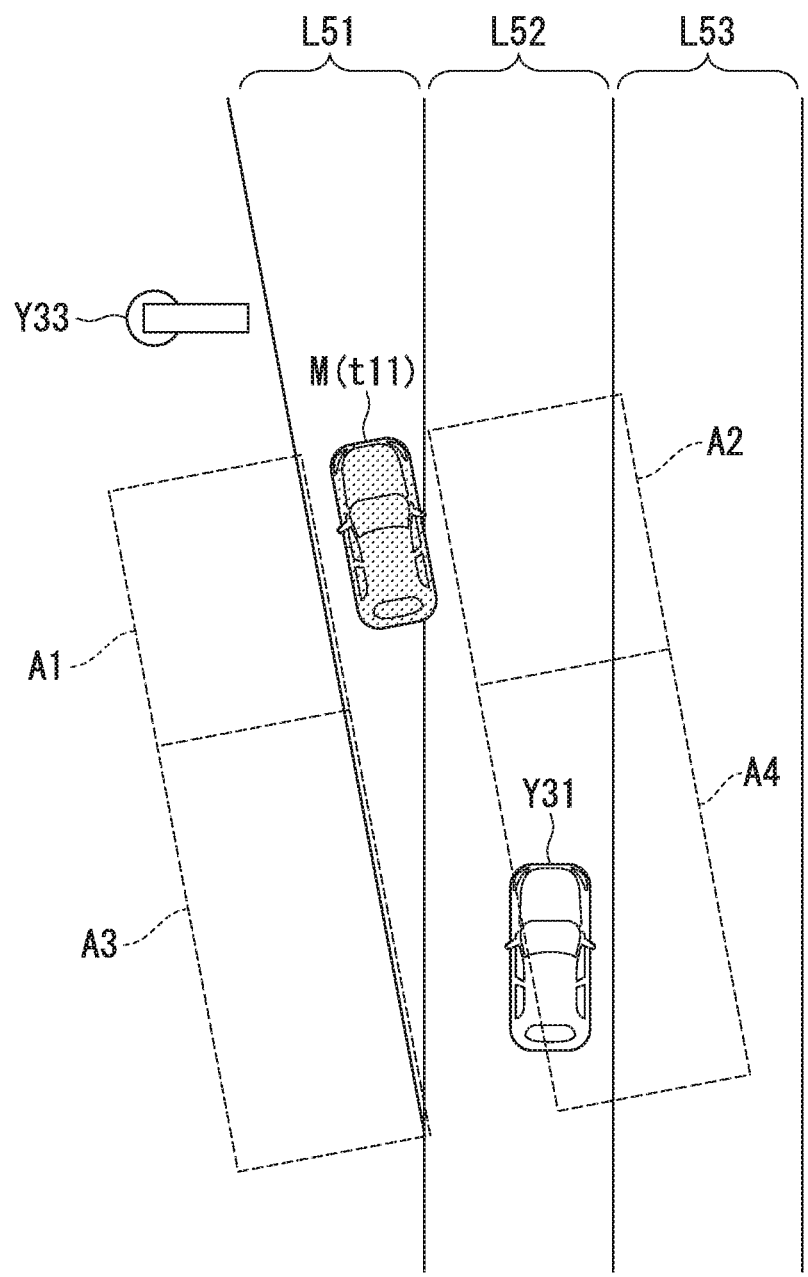
FIG. 11 is a diagram illustrating a time-series scene in which a host vehicle enters a branching lane at a branching point.
Figure 12:
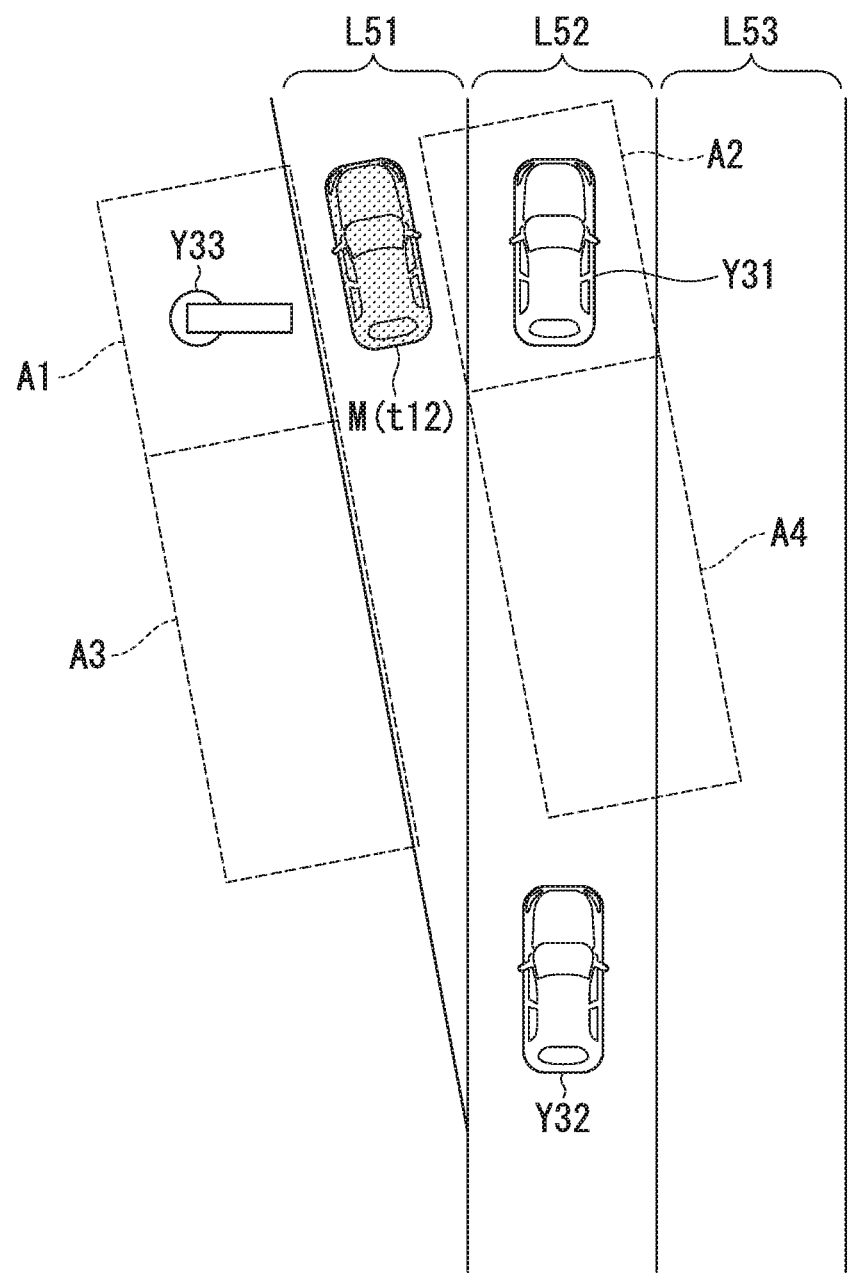
FIG. 12 is a diagram illustrating a time-series scene in which a host vehicle enters a branching lane at a branching point.

Next, a first scene example in which branching driving support control is executed will be described. FIGS. 11 and 12 are diagrams illustrating time-series scenes in which the host vehicle M enters a branching lane at a branching point. FIGS. 11 and 12 illustrate the states at time points t11 and t12, respectively. It is assumed that no later than time point t11, the occupant has operated the winker lever which is an example of a driving operator to change lane and the left-side winker of the host vehicle M is operating.

As illustrated in FIG. 11, the branching point includes lanes L52 and L53 which are main lanes and a branching lane L51. The branching lane L51 is a lane that extends from the lane L52 so that the lane width increases gradually. At time point t11, the host vehicle M enters the branching lane L51. The other vehicle Y31 travels around the host vehicle M. The other vehicle Y31 travels on the lane L32 and is recognized in a target area A4. In this state, since the host vehicle M has deviated from the main lane and has entered the branching lane L31, the likelihood of contact between the host vehicle M and the other vehicle Y31 is low. Due to this, the notification controller 134 does not output an alarm. In this state, a first alarm is output in the case of normal driving support control. However, in the case of branching driving support control, since a predetermined operation is prevented, the inconvenience that the occupant may feel can be alleviated.

As illustrated in FIG. 11, even when the other vehicle Y31 is recognized in the target area A4 which is the rear-side area of the host vehicle M, the notification controller 134 may prevent the predetermined operation according to the TTC between the host vehicle M and the other vehicle Y31. For example, the notification controller 134 outputs the first alarm when the TTC between the host vehicle M and the other vehicle Y31 is equal to or smaller than the threshold TTC2 and does not output the first alarm when the TTC is larger than the threshold TTC2. The threshold TTC2 is a value smaller than the threshold TTC1 for determining whether the first alarm will be output in the normal driving support control. In this way, alarming is prevented when TTC is larger than TTC2 even if TTC is equal to or smaller than TTC1.

After that, at time point t12, as illustrated in FIG. 12, the host vehicle M approaches closer to the branching lane L31. The other vehicles Y31 and Y32 are traveling around the host vehicle M. The position at which the other vehicle Y31 is recognized moves from the target area A4 to the target area A2. On the other hand, the position at which the other vehicle Y32 is recognized is outside the target areas. In this state, the notification controller 134 outputs the first alarm to inform the occupant of the fact that the other vehicle Y31 is approaching further closer. When the first alarm has already been output, the state is maintained. In this way, it is possible to call the occupant's attention to the other vehicle Y31 traveling on the later side of the host vehicle M.

At time point t12, an object Y33 is recognized in the target area A1. The contact possibility determination unit 133 recognizes that the object Y33 is an object other than a vehicle since the position at which the object Y33 is recognized is in an area other than a lane. Due to this, although the object Y33 is recognized in the target area A1, the notification controller 134 does not output any alarm with respect to the object Y33. In this way, the inconvenience that the occupant may feel can be alleviated.

Second Example of Branching Driving Support Control Execution Scene

Next, a second scene example in which a branching contact suppression support process is executed will be described. FIGS. 13 to 16 are diagrams illustrating time-series scenes before the host vehicle M enters a branching lane at a branching point. FIGS. 13, 14, 15, and 16 illustrate the states at time points t21, t22, t23, and t24, respectively. The branching point is the same road as the road illustrated in FIGS. 11 and 12. It is assumed that no later than time point t21, the occupant has operated the winker lever which is an example of a driving operator to change lane and the left-side winker of the host vehicle M is operating.

Figure 13:
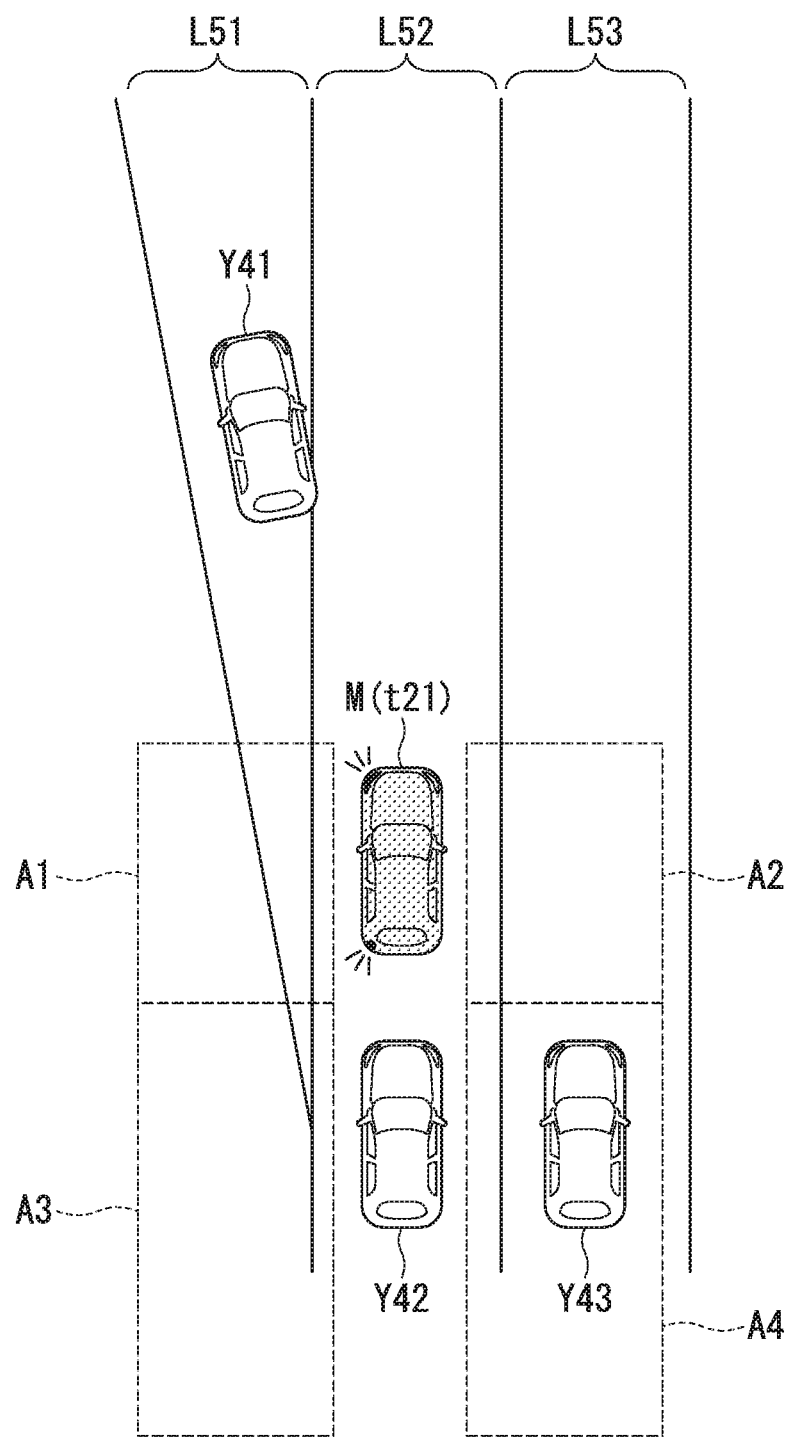
FIG. 13 is a diagram illustrating a time-series scene before a host vehicle enters a branching lane at a branching point.

At time point t21, as illustrated in FIG. 13, the host vehicle M travels along a lane L52. Other vehicles Y41, Y42, and Y43 are traveling around the host vehicle M. The other vehicle Y41 is outside a target area and is traveling on a side in front of the host vehicle M on the branching lane L51. The other vehicle Y42 is outside the target area and is traveling on a rear side of the host vehicle M on the same lane L52 as the host vehicle M. The other vehicle Y43 is traveling on the lane L53 and is recognized in the target area A4. In this state, although the other vehicle Y43 is recognized in the target area A4, since the target area A4 in which the other vehicle Y43 is recognized is on the opposite side from the side where the branching lane L51 that the host vehicle M is entering is present when seen from the traveling direction of the host vehicle M, the notification controller 134 does not output an alarm. In this state, the first alarm is output in the case of the normal driving support control. However, in the case of branching driving support control, since a predetermined operation is suppressed, the inconvenience that the occupant may feel can be alleviated.

As illustrated in FIG. 13, even when the other vehicle Y43 is recognized in the target area A4 which is an area on the rear side of the host vehicle M, the notification controller 134 may prevent a predetermined operation according to the TTC between the host vehicle M and the other vehicle Y43. For example, the notification controller 134 outputs the first alarm when the TTC between the host vehicle M and the other vehicle Y43 is equal to or smaller than the threshold TTC2 and does not output the first alarm when the TTC is larger than the threshold TTC2.

Figure 14:
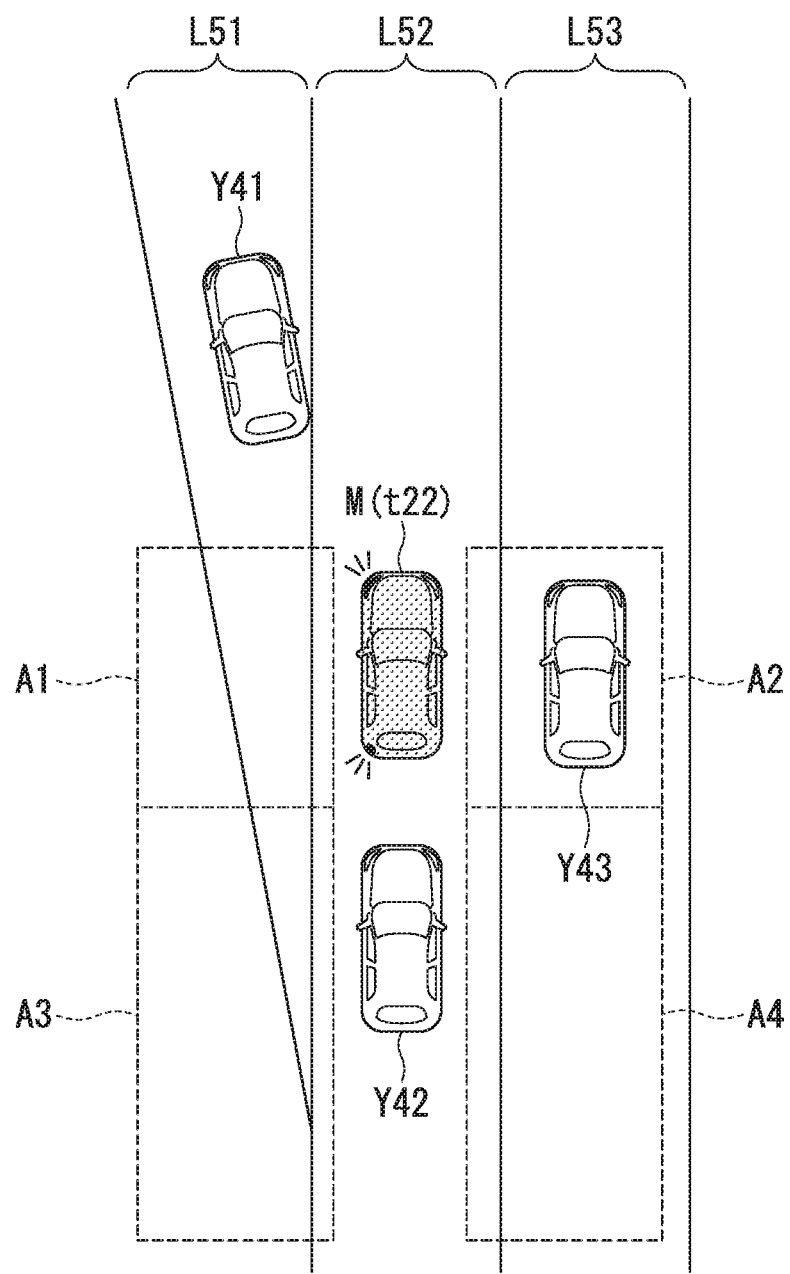
FIG. 14 is a diagram illustrating a time-series scene before a host vehicle enters a branching lane at a branching point.

After that, at time point t22, as illustrated in FIG. 14, the position at which the other vehicle Y43 is recognized moves from the target area A4 to the target area A2. In this state, the notification controller 134 outputs the first alarm in order to inform the occupant of the fact that the other vehicle Y43 is approaching further closer from the right side of the host vehicle M. When the first alarm has already been output, the state is maintained.

Figure 15:
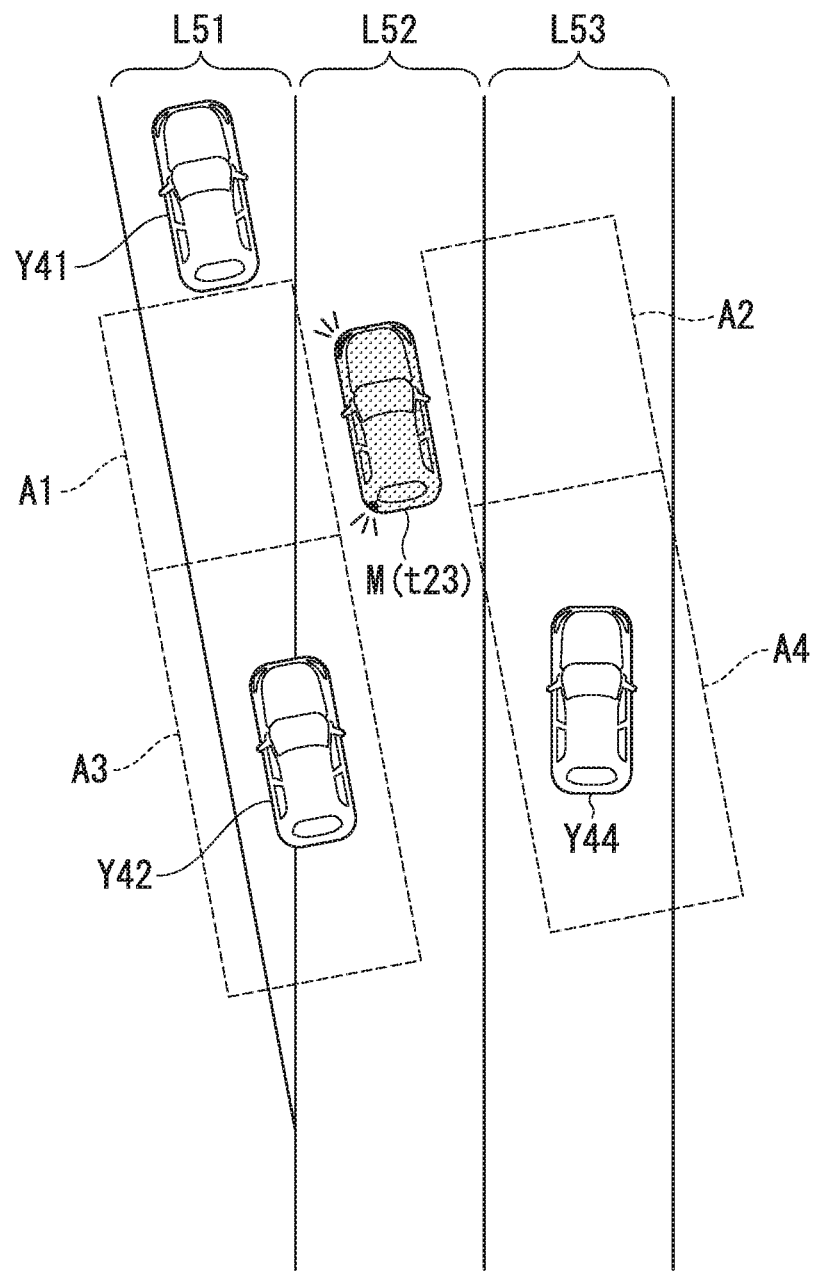
FIG. 15 is a diagram illustrating a time-series scene before a host vehicle enters a branching lane at a branching point.

At time point t23, as illustrated in FIG. 15, the occupant of the host vehicle M operates the steering wheel which is an example of a driving operator to enter the branching lane L51 to move the host vehicle M from the lane L52 to the lane L51. The position at which the other vehicle Y43 is recognized moves outside the target areas from the target area A2, and the position at which the other vehicle Y42 is recognized moves to the target area A3 from the outside of the target areas. In this state, the notification controller 134 stops the BSI indicator 60 to stop the output of the first alarm to inform the occupant of the fact that the other vehicle Y43 has moved further from the host vehicle M. That is, no image is displayed on the mirror surface of the right-side door mirror DMR1.

The notification controller 134 operates the BSI indicator 60 to output the first alarm to inform the occupant of the fact that the other vehicle Y42 is approaching from the left side of the host vehicle M. For example, the notification controller 134 lights the warning image 60a on the mirror surface of the left-side door mirror DMR2. In this state, although the third alarm is output in the case of normal driving support control, a predetermined operation is prevented and the first alarm is output in the case of branching driving support control. In this way, the inconvenience that the occupant may feed can be alleviated.

As illustrated in FIG. 15, even when the other vehicle Y42 is recognized in the target area A3, the notification controller 134 may prevent the predetermined operation depending on the TTC between the host vehicle M and the other vehicle Y42. For example, the notification controller 134 outputs the first alarm when the TTC between the host vehicle M and the other vehicle Y42 is equal to or smaller than the threshold TTC2 and does not output the first alarm when the TTC is larger than the threshold TTC2. The notification controller 134 may output the first alarm when the direction of the trajectory of the host vehicle M estimated by the trajectory estimator 131 is different from the direction of the trajectory of the other vehicle Y42 and may not output the first alarm when the directions of both trajectories are the same. A case where the directions of both trajectories are the same includes a case in which the directions of both trajectories are substantially the same although the directions are not exactly the same and a predetermined gap is present between both trajectories.

In such a case as illustrated in FIG. 15, the other vehicle Y42 merges to the branching lane L51 from the rear side of the host vehicle M and is highly likely to make contact with the host vehicle M. Since a branching point is a parking area on an expressway, a service area, an interchange, or the like, and the sense of speed of the driver of the host vehicle M or the driver of the other vehicle Y42 may be different from their normal sense of speed, the likelihood of contact increases further. Due to this, the notification controller 134 may not prevent the predetermined normal operation when the other vehicle Y42 is recognized in the target area A3 in such a state. That is, the notification controller 134 may output the second alarm. It has been described that an alarm for the other vehicle Y42 is prevented in the state of FIG. 15 since the likelihood of passing at the branching point is low. However, when the entering speed of the host vehicle M entering the branching lane L51 is low, there is a possibility that the other vehicle Y42 passes the host vehicle M and enters the branching lane L51. In such a state, the notification controller 134 may not prevent the predetermined normal operation when the other vehicle Y42 is recognized in the target area A3. That is, the notification controller 134 may output the second alarm.

As illustrated in FIG. 15, the other vehicle Y44 is recognized in the target area A4. In this case, the notification controller 134 does not output an alarm. In this state, although the first alarm is output in the case of normal driving support control when the TTC is equal to or smaller than the threshold TTC1, since the predetermined operation is prevented in the case of branching driving support control, the inconvenience that the occupant may feed can be alleviated.

Figure 16:
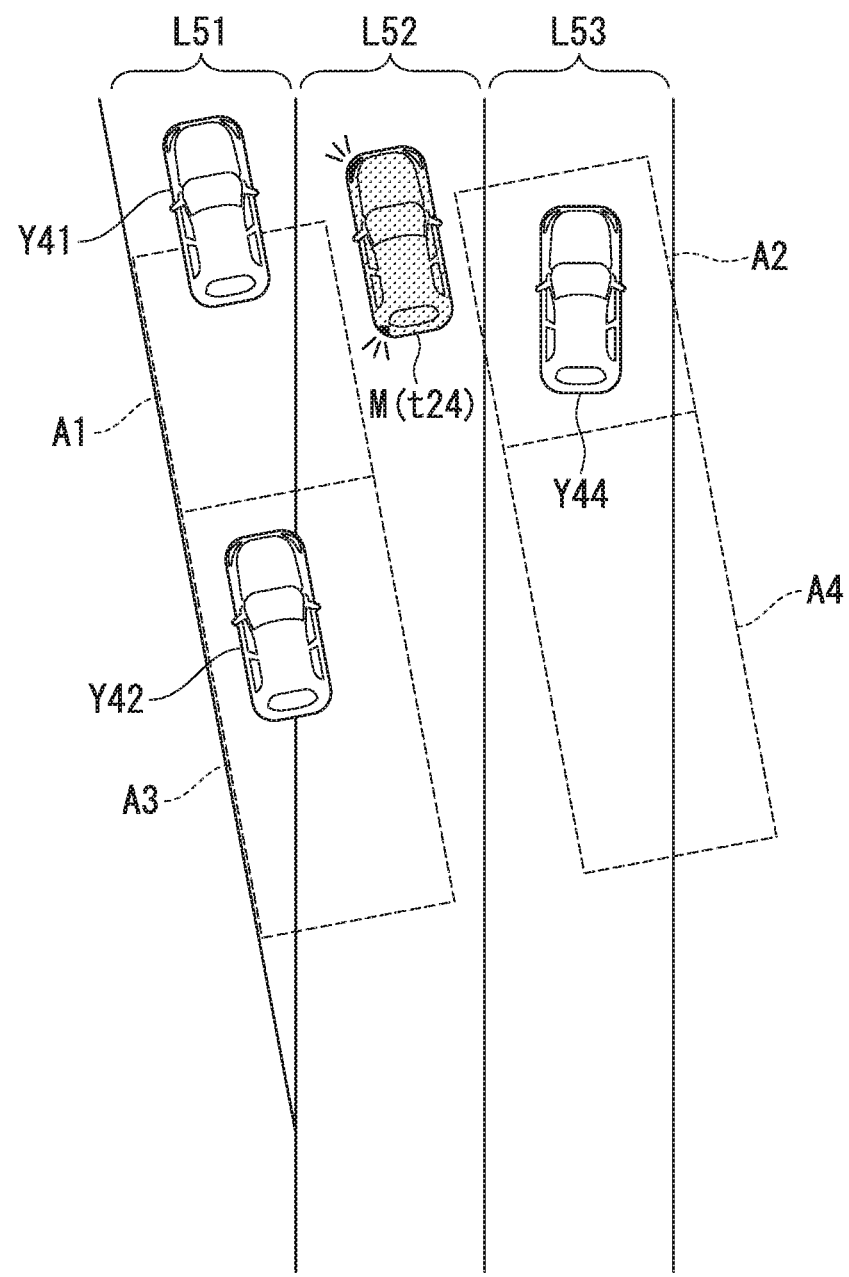
FIG. 16 is a diagram illustrating a time-series scene before a host vehicle enters a branching lane at a branching point.

At time point t24, as illustrated in FIG. 16, the position at which the other vehicle Y41 is recognized moves from the outside of the target area to the target area A1, and the position at which the other vehicle Y44 is recognized moves from the outside of the target area to the target area A2. In this state, the notification controller 134 outputs the second alarm in order to inform the occupant of the fact that the other vehicle Y41 is approaching from the left side of the host vehicle M. For example, the notification controller 134 lights the warning image 60a on the mirror surface of the right-side door mirror DMR1. The notification controller 134 controls the BSI indicator 60 to output the first alarm when the first alarm is not output in order to inform the occupant of the fact that the other vehicle Y44 is approaching further closer from the right side of the host vehicle M. For example, the notification controller 134 lights the warning image 60a on the mirror surface of the right-side door mirror DMR 1.

[Process Flow]

Figure 17:
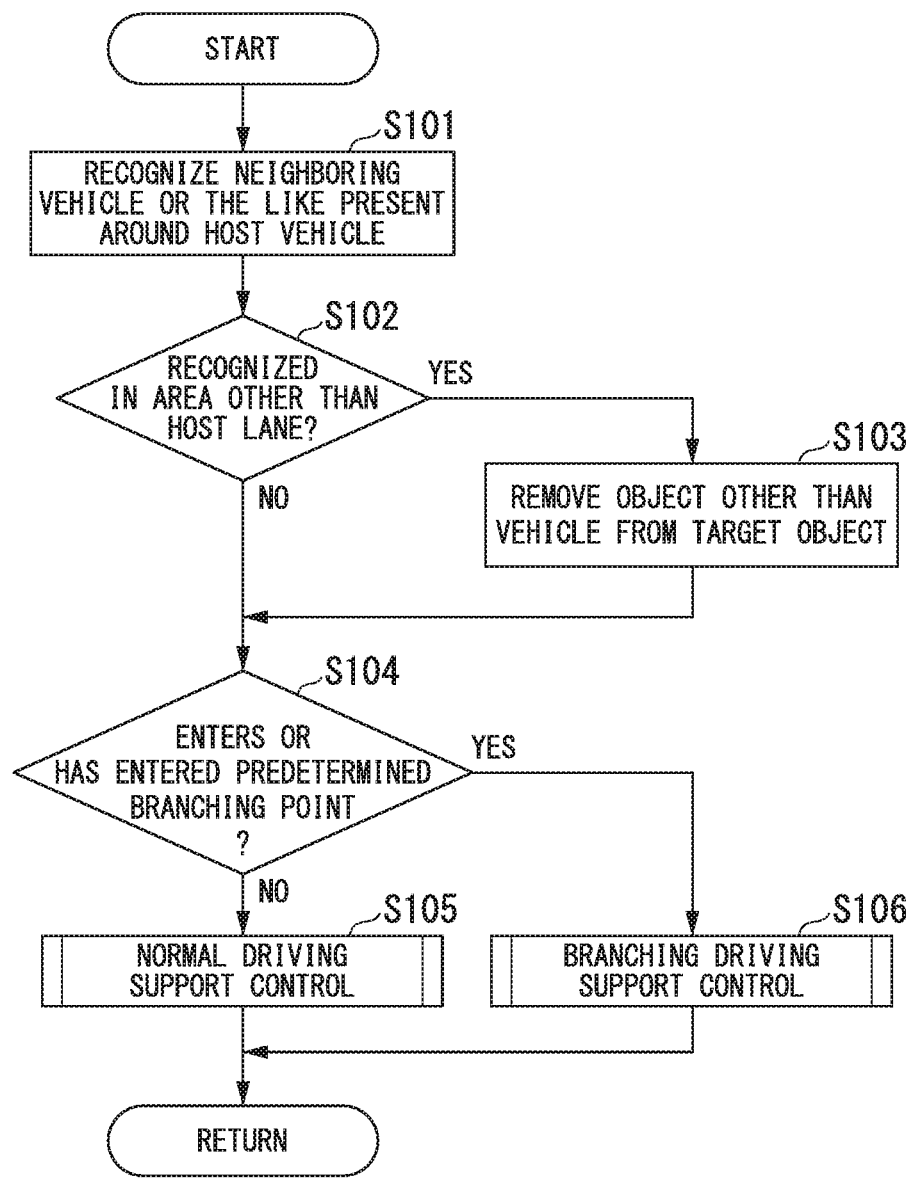
FIG. 17 is a flowchart illustrating an example of the flow of a vehicle control process according to an embodiment.

FIG. 17 is a flowchart illustrating an example of the flow of a vehicle control process according to the embodiment. For example, the process of this flowchart may be executed repeatedly at predetermined periods or at predetermined timings during execution of the driving support control. First, the outside world recognizer 110 recognizes a neighboring vehicle or the like present around the host vehicle M (step S101). Subsequently, the host vehicle position recognizer 120 recognizes a host lane along which the host vehicle M is traveling and an adjacent lane and determines whether the neighboring vehicle or the like is recognized in an area other than a main lane including the host lane and the adjacent lane (step S102).

When the neighboring vehicle or the like is recognized in an area other than the main lane, the apparatus operation controller 130 determines that the neighboring vehicle or the like recognized in an area other than the main lane is an object other than a vehicle (step S103). In other words, the apparatus operation controller 130 determines a neighboring vehicle or the like recognized in the main lane as the other vehicle. On the other hand, when the neighboring vehicle or the like is not recognized in an area other than the main lane, the apparatus operation controller 130 determines that all neighboring vehicles or the like recognized by the outside world recognizer 110 are the other vehicles.

Subsequently, the apparatus operation controller 130 determines whether the host vehicle M enters or has entered a branching point (step S104). When it is determined that the host vehicle M does not enter or has not entered the branching point, the apparatus operation controller 130 executes normal driving support control (step S105). On the other hand, when it is determined that the host vehicle M enters or has entered the branching point, the apparatus operation controller 130 executes branching driving support control (step S106). The details of the normal driving support control and the branching driving support control will be described below.

Figure 18:
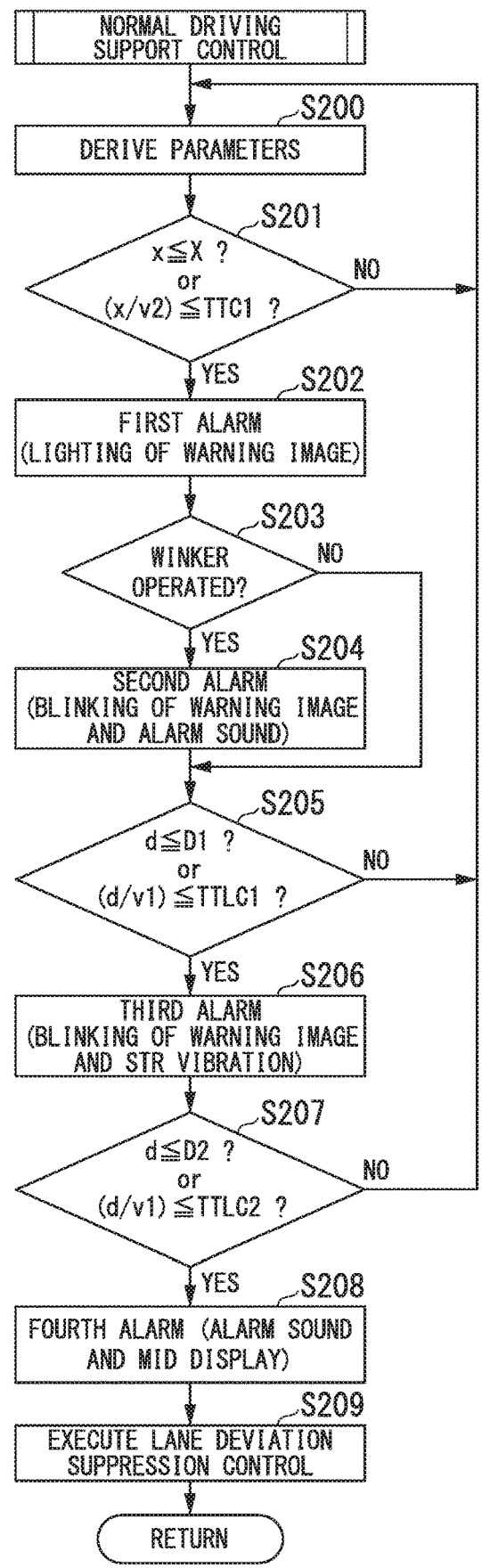
FIG. 18 is a flowchart illustrating an example of normal driving support control.

First, a processing example of the normal driving support control will be described with reference to FIG. 18. FIG. 18 is a flowchart illustrating an example of normal driving support control. The trajectory estimator 131 derives parameters related to the behavior of the host vehicle M (step S200). For example, the trajectory estimator 131 derives the distance d between the host vehicle M and the lane marking, the lateral speed v1 of the host vehicle M, the distance x between the host vehicle M and the other vehicle, the relative speed v2 between the host vehicle M and the other vehicle, TTC (x/v2), and TTLC (d/v1). Subsequently, the contact possibility determination unit 133 determines whether the distance x to the other vehicle is equal to or smaller than the threshold X or the TTC (x/v2) is equal to or smaller than the threshold TTC1 (step S201). When the distance x to the other vehicle is larger than the threshold X and the TTC (x/v2) is larger than the threshold TTC1, the flow returns to step S200. On the other hand, when the distance x to the other vehicle is equal to or smaller than the threshold X or the TTC (x/v2) is equal to or smaller than the threshold TTC1, the contact possibility determination unit 133 controls the notification controller 134 to output the first alarm (step S202). The first alarm includes lighting the warning image 60a on the mirror surface of the door mirror DMR, for example.

Subsequently, the contact possibility determination unit 133 determines whether the winker is operating (step S203). When the winker is operating, the contact possibility determination unit 133 determines whether the other vehicle is recognized in an adjacent lane on the side where the winker is operating in the traveling direction of the host vehicle M. When a positive determination result is obtained, the contact possibility determination unit 133 controls the notification controller 134 to output the second alarm (step S204). The second alarm includes blinking the warning image 60a on the mirror surface of the door mirror DMR and outputting an alarm sound multiple times, for example. On the other hand, when the other vehicle is recognized in the adjacent lane on the opposite side from the side where the winker is operating in the traveling direction of the host vehicle M, the second alarm is not output.

On the other hand, when it is determined in step S203 that the winker is not operating, the contact possibility determination unit 133 determines whether the distance d between the host vehicle M and the lane marking is equal to or smaller than the threshold D1 or the TTLC (d/v1) is equal to or smaller than the threshold TTLC1 (step S205). When the distance d between the host vehicle M and the lane marking is larger than the threshold D1 and the TTLC (d/v1) is larger than the threshold TTLC1 of the TTLC, the contact possibility determination unit 133 returns to step S200. On the other hand, when the distance d between the host vehicle M and the lane marking is equal to or smaller than the threshold D1 or the TTLC (d/v1) is equal to or smaller than the threshold TTLC1, the contact possibility determination unit 133 controls the notification controller 134 to output the third alarm (step S206). The third information includes blinking the warning image 60a and vibrating the steering wheel, for example.

Subsequently, the contact possibility determination unit 133 determines whether the distance d between the host vehicle M and the lane marking is equal to or smaller than the threshold D2 smaller than the threshold D1 or the TTLC (d/v1) is equal to or smaller than the threshold TTLC2 smaller than the threshold TTLC1 (step S207). When the distance d between the host vehicle M and the lane marking is larger than the threshold D2 and the TTLC (d/v1) is larger than the threshold TTLC2, the contact possibility determination unit 133 returns to step S200. On the other hand, when the distance d between the host vehicle M and the lane marking is equal to or smaller than the threshold D2 and the TTLC (d/v1) is equal to or smaller than the threshold TTLC2, the contact possibility determination unit 133 controls the notification controller 134 to output the fourth alarm (step S208) and executes lane deviation suppression control (step S209). The fourth alarm includes blinking the warning image 60a, outputting an alarm sound, and displaying an image indicating that the host vehicle M and the other vehicle Y11 are approaching each other on the display 22, for example.

Figure 19:
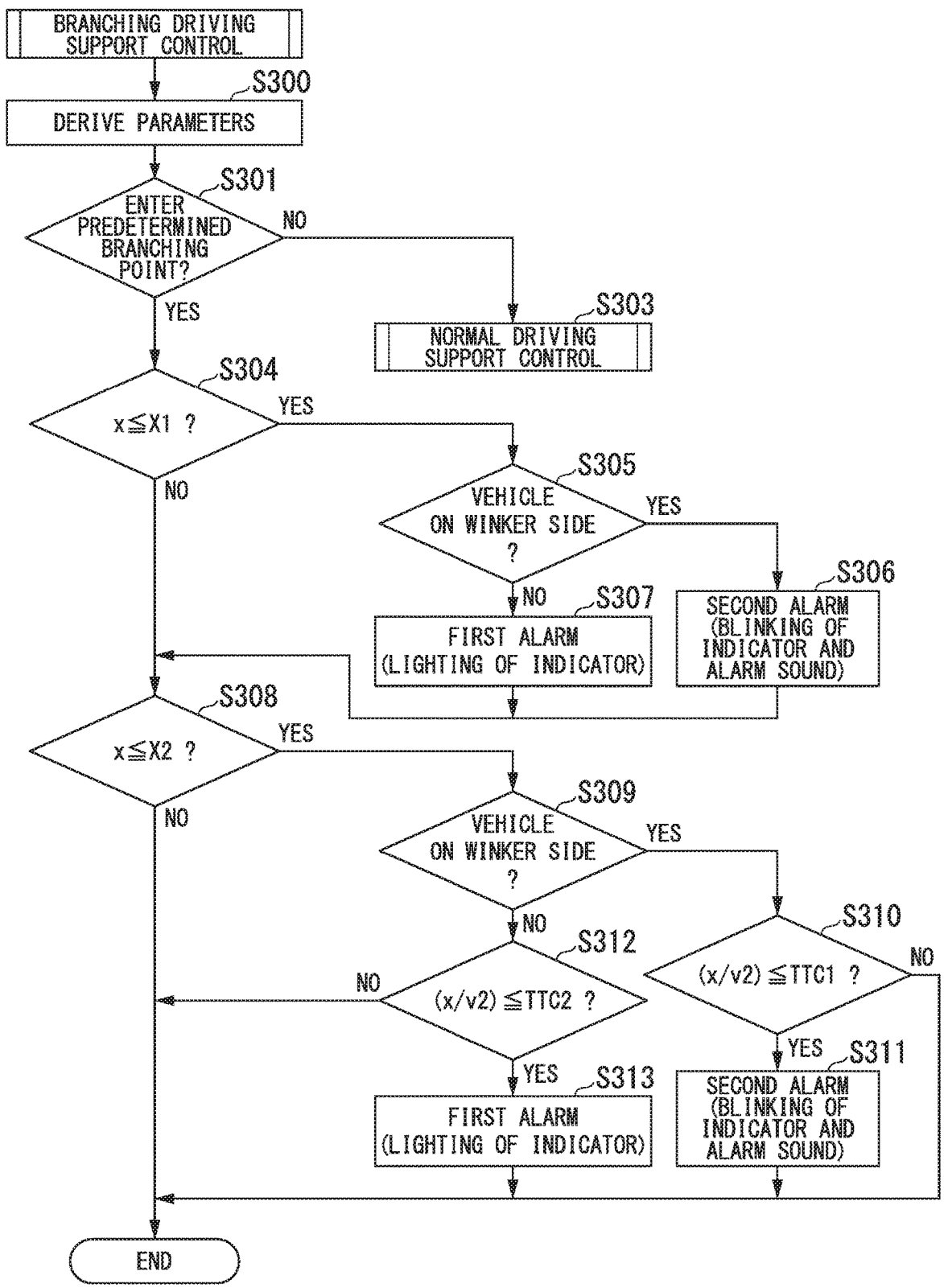
FIG. 19 is a flowchart illustrating an example of branching driving support control.

Next, a processing example of branching driving support control will be described with reference to FIG. 19. FIG. 19 is a flowchart illustrating an example of branching driving support control. The trajectory estimator 131 derives parameters related to the behavior of the host vehicle M (step S300). For example, the trajectory estimator 131 derives the distance d between the host vehicle M and the lane marking, the lateral speed v1 of the host vehicle M, the distance x between the host vehicle M and the other vehicle, the relative speed v2 between the host vehicle M and the other vehicle, TTC (x/v2), and TTLC (d/v1).

Subsequently, the contact possibility determination unit 133 determines whether the host vehicle M enters or has entered the branching point (step S301). When it is determined that the host vehicle M does not enter or has not entered the branching point, the contact possibility determination unit 133 executes normal driving support control (step S303).

On the other hand, when it is determined in step S301 that the host vehicle M enters or has entered the branching point, the contact possibility determination unit 133 determines whether the distance x between the host vehicle M and the other vehicle is equal to or smaller than the threshold X1 (step S304). That is, the contact possibility determination unit 133 determines whether an area in which the other vehicle is recognized is the target area A1 or A2 on the lateral side of the host vehicle M among the target areas. When it is determined that the distance x between the host vehicle M and the other vehicle is equal to or smaller than the threshold X1, the contact possibility determination unit 133 determines whether the other vehicle is a vehicle traveling along an adjacent lane on the side where the winker of the host vehicle M is operating (step S305).

When it is determined that the other vehicle is a vehicle traveling along an adjacent lane on the side where the winker of the host vehicle M is operating, the contact possibility determination unit 133 controls the notification controller 134 to output the second alarm (step S306). On the other hand, when it is determined that the other vehicle is a vehicle traveling along an adjacent lane on the side where the winker of the host vehicle M is operating, the contact possibility determination unit 133 controls the notification controller 134 to output the first alarm (step S307).

When it is determined in step S304 that the distance x between the host vehicle M and the other vehicle is equal to or smaller than the threshold X1, the contact possibility determination unit 133 determines whether the distance x between the host vehicle M and the other vehicle is equal to or smaller than the threshold X2 (step S308). That is, the contact possibility determination unit 133 determines whether an area in which the other vehicle is recognized is the target area A3 or A4 on the rear side of the host vehicle M among the target areas. When it is determined that the distance x between the host vehicle M and the other vehicle is equal to or smaller than the threshold X2, the contact possibility determination unit 133 determines whether the other vehicle is a vehicle traveling along an adjacent lane on the side where the winker of the host vehicle M is operating (step S309).

When it is determined that the other vehicle is a vehicle traveling along an adjacent lane on the side where the winker of the host vehicle M is operating, the contact possibility determination unit 133 determines whether the TTC (x/v2) is equal to or smaller than the threshold TTC1 (step S310). When it is determined that the TTC (x/v2) is equal to or smaller than the threshold TTC1, the contact possibility determination unit 133 controls the notification controller 134 to output the second alarm (step S311). On the other hand, when it is determined that the TTC (x/v2) is equal to or smaller than the threshold TTC1, the contact possibility determination unit 133 does not output any alarm.

When it is determined in step S309 that the other vehicle is not a vehicle traveling along an adjacent lane on the side where the winker of the host vehicle M is operating, the contact possibility determination unit 133 determines whether the TTC (x/v2) is equal to or smaller than the threshold TTC2 (step S312). When it is determined that the TTC (x/v2) is equal to or smaller than the threshold TTC2, the contact possibility determination unit 133 controls the notification controller 134 to output the first alarm (step S313). On the other hand, when it is determined that the TTC (x/v2) is larger than the threshold TTC2, the contact possibility determination unit 133 does not output any alarm.

According to the above-described embodiment, it is possible to prevent a predetermined operation of the onboard apparatus appropriately. For example, normal alarms are output as usual with respect to the other vehicle traveling on a lateral side of the host vehicle M and some of normal alarms are restricted with respect to the other vehicle approaching the host vehicle M from the rear side. When the host vehicle M enters or has entered a predetermined branching point, the other vehicle travels along an adjacent lane, and the host vehicle M merges into the adjacent lane, it is possible to restrict the contact avoidance control from being executed.

In a scene in which the speed of the host vehicle decreases temporarily, for example, when the host vehicle enters a branching point such as a parking area of an expressway or the like, the TTC between the host vehicle and a following vehicle decreases. In many cases, a stationary object such as a mark is present in a predetermined branching point, when such a stationary object is recognized as a neighboring vehicle or the like, TTC decreases. Due to this, the TTC may be compared with the same threshold as that of the normal driving support control to determine the likelihood of contact. As a result, a larger number of alarms than necessary are output. Moreover, contact avoidance control may be executed whereby the host vehicle cannot merge into the branching lane. According to the above-described embodiment, such a problem can be solved.

When it is expected that the host vehicle M enters a branching lane, it is expected that the likelihood of the host vehicle M to move to the opposite side from the branching side. The contact possibility determination unit 133 can prevent an alarm for the other vehicle traveling along an adjacent lane on the opposite side from the branching side in the traveling direction of the host vehicle M and can alleviate inconvenience.

It is predicted that the likelihood of the host vehicle M to return to a lane (an original lane) before branching after the host vehicle M moved to the branching lane. When the host vehicle M has moved to a branching lane, the contact possibility determination unit 133 may prevent alarms for the other vehicle recognized in a lane along which the host vehicle was traveling before moving to the branching lane. In this way, it is possible to alleviate inconvenience.

<Hardware Configuration>

Figure 20:
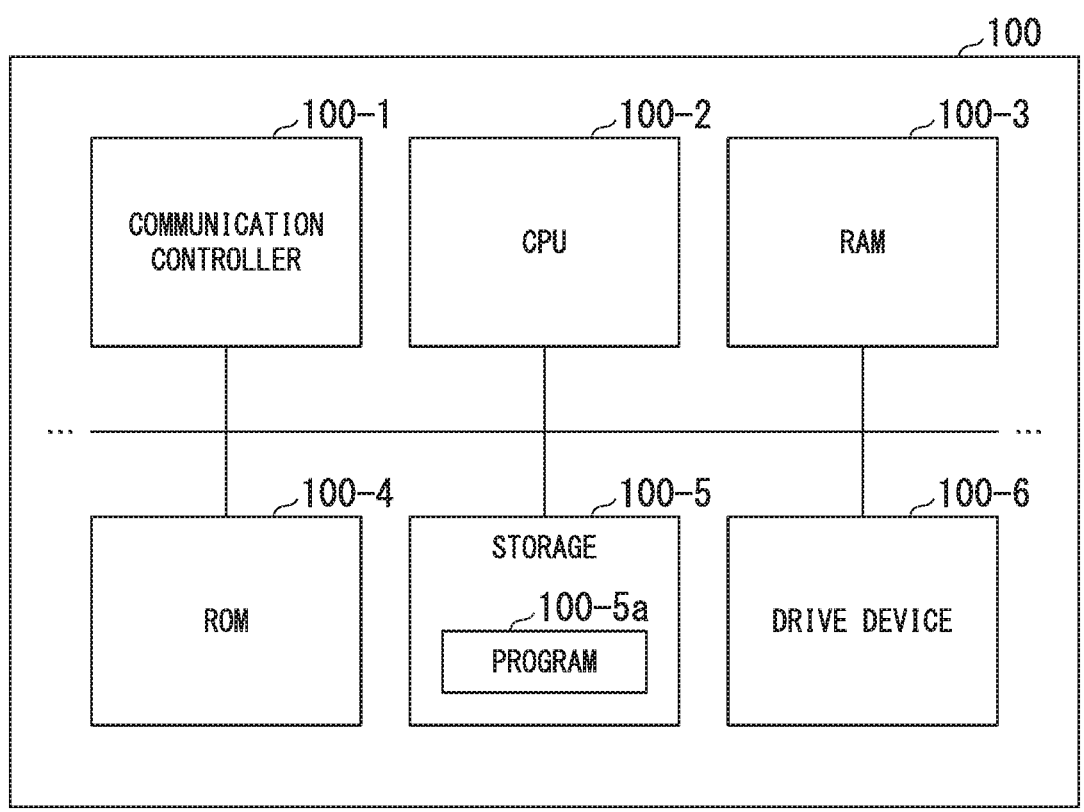
FIG. 20 is a diagram illustrating an example of a hardware configuration of the vehicle control device according to the embodiment.

The vehicle control device 100 of the above-described embodiment is realized by such a hardware configuration as illustrated in FIG. 20, for example. FIG. 20 is a diagram illustrating a configuration of a hardware configuration of the vehicle control device 100 according to the embodiment.

The vehicle control device 100 has a configuration in which a communication controller 100-1, a CPU 100-2, a random access memory (RAM) 100-3, a read only memory (ROM) 100-4, a storage 100-5 such as a flash memory or a HDD, and a drive device 100-6 are connected to each other by an internal bus or a dedicated communication line. A portable recording medium such as an optical disc is attached to the drive device 100-6. A program 100-5*a* stored in the storage 100-5 or a program stored in a portable recording medium attached to the drive device 100-6 is loaded onto the RAM 100-3 by a direct memory access (DMA) controller (not illustrated) or the like and is executed by the CPU 100-2, whereby the functions of the vehicle control device 100 are realized. The program referred to by the CPU 100-2 may be downloaded from another device via a network such as the Internet, for example.

The above-described embodiment can be expressed as follows.

A vehicle control device including:

a storage that stores information; and a hardware processor that executes a program, wherein the storage stores the program for causing the hardware processor to execute:

a recognition process of recognizing an object present around a host vehicle; and an apparatus operation control process of determining whether the object is recognized in a predetermined target area set around the host vehicle and causing an onboard apparatus to perform a predetermined operation when it is determined that an object has been recognized in the target area, and the apparatus operation control process determines whether the host vehicle enters or has entered a predetermined branching point and suppresses the predetermined operation when it is determined that the host vehicle enters or has entered the predetermined branching point.

While modes for implementing the present invention have been described using embodiments, the present invention is not limited to these embodiments and various modifications and substitutions can be added without departing from the scope of the present invention.

For example, when the distance d between the host vehicle and a lane marking on the opposite side from a branching side in the traveling direction of the host vehicle is equal to or smaller than the threshold D1, the third alarm is output in the normal driving support control. However, in the branching driving support control, the contact possibility determination unit 133 may prevent the alarm even in such a state. For example, the contact possibility determination unit 133 may change the threshold D1 to a smaller threshold and may output the first alarm or the second alarm which is on the lower level than the third alarm. An alarm for the other vehicle in a target area on the rear side opposite to the branching side in the traveling direction of the host vehicle M may be prevented more than an alarm for the other vehicle in the other target areas.

What is claimed is:

1. A vehicle control device comprising:

a recognizer that recognizes an object present around a host vehicle; and an apparatus operation controller that determines whether the object is recognized in a predetermined target area by the recognizer and causes an onboard apparatus to perform at least an operation of notifying of a likelihood of contact between the host vehicle and the object in response to determining that the object has been recognized in the predetermined target area by the recognizer, wherein the predetermined target area is set around the host vehicle, the apparatus operation controller determines whether the host vehicle enters or has entered a branching point in which a diverging branching road extends from a main lane in a direction different from a travelling direction of the main lane, the apparatus operation controller causes the onboard apparatus to perform the operation of notifying under a first condition if the apparatus operation controller does not determine that the host vehicle enters or has entered the branching point, the apparatus operation controller causes the onboard apparatus to perform the operation of notifying under a second condition if the apparatus operation controller determines that the host vehicle enters or has entered the branching point, the second condition is more severe than the first condition to perform the operation of notifying, the apparatus operation controller lowers a level of the operation executed in a lowering case as compared to another level of the operation executed in a case other than the lowering case, and the lowering case includes a case in which the object recognized in the target area by the recognizer is traveling along another lane adjacent to a host lane along which the host vehicle is traveling, the other lane being located on a distant side from a branching lane extending from the branching point.

2. The vehicle control device according to claim 1, wherein in response to determining that the object has been recognized in the predetermined target area by the recognizer, the apparatus operation controller further causes the onboard apparatus to perform another operation of avoiding contact between the host vehicle and the object.

3. The vehicle control device according to claim 1, wherein in response to determining that the host vehicle has moved to the branching lane, the apparatus operation controller lowers the level of the operation for the object recognized in a lane along which the host vehicle has been traveling before the host vehicle moved to the branching lane.

4. The vehicle control device according to claim 1, wherein the target area includes an area to a side of the host vehicle and an area behind the host vehicle, and the apparatus operation controller lowers a level of the operation in response to a determination by the recognizer that the object is in the area behind the host vehicle as compared to another level of the operation set in response to a determination by the recognizer that the object is in the area to the side by the recognizer.

5. The vehicle control device according to claim 1, wherein the apparatus operation controller lowers a level of the operation in response to determining that the host vehicle enters or has entered the branching point and the object in the target area recognized by the recognizer is not on a branching lane extending from the branching point, and does not lower the level of the operation in response to determining that the host vehicle enters or has entered the branching point and the object in the target area recognized by the recognizer is on a branching lane extending from the branching point.

6. The vehicle control device according to claim 1, wherein
the apparatus operation controller determines whether the host vehicle enters or has entered the branching point based on map information and position information of the host vehicle.

7. The vehicle control device according to claim 1, wherein in response to determining that the host vehicle enters or has entered the branching point, the apparatus operation controller lowers a level of the operation by changing a notification detail for notifying of the likelihood of contact between the host vehicle and the object.

8. A vehicle control device, comprising:
a recognizer that recognizes an object present around a host vehicle; and
an apparatus operation controller that determines whether the object is recognized in a predetermined target area by the recognizer and causes an onboard apparatus to perform at least an operation of notifying of a likelihood of contact between the host vehicle and the object in response to determining that the object has been recognized in the predetermined target area by the recognizer,
wherein
the predetermined target area is set around the host vehicle,
the apparatus operation controller
determines whether the host vehicle is traveling on an expressway based on a history of a traveling speed of the host vehicle, and
determines that the host vehicle enters or has entered a branching point based on a determination that the host vehicle is in a decelerating state of a predetermined level or higher and further based on detection of a lateral movement whereby the host vehicle changes lanes after the host vehicle is determined to be traveling on the expressway,
the apparatus operation controller causes the onboard apparatus to perform the operation of notifying under a first condition if the apparatus operation controller does not determine that the host vehicle enters or has entered the branching point,
the apparatus operation controller causes the onboard apparatus to perform the operation of notifying under a second condition if the apparatus operation controller determines that the host vehicle enters or has entered the branching point, and
the second condition is more severe than the first condition to perform the operation of notifying.

9. A vehicle control device, comprising:
a recognizer that recognizes an object present around a host vehicle; and
an apparatus operation controller that determines whether the object is recognized in a predetermined target area by the recognizer and causes an onboard apparatus to perform at least an operation of notifying of a likelihood of contact between the host vehicle and the object in response to determining that the object has been recognized in the predetermined target area by the recognizer,
wherein
the predetermined target area is set around the host vehicle,
the apparatus operation controller determines that the host vehicle enters or has entered a branching point based on detection of a predetermined mark in an image, received from a camera, of a side in front of the host vehicle, and a subsequent detection that the host vehicle is moving toward the predetermined mark,
the apparatus operation controller causes the onboard apparatus to perform the operation of notifying under a first condition if the apparatus operation controller does not determine that the host vehicle enters or has entered the branching point,
the apparatus operation controller causes the onboard apparatus to perform the operation of notifying under a second condition if the apparatus operation controller determines that the host vehicle enters or has entered the branching point, and
the second condition is more severe than the first condition to perform the operation of notifying.

10. A vehicle control device, comprising:
a recognizer that recognizes an object present around a host vehicle; and
an apparatus operation controller that determines whether the object is recognized in a predetermined target area by the recognizer and causes an onboard apparatus to perform at least an operation of notifying of a likelihood of contact between the host vehicle and the object in response to determining that the object has been recognized in the predetermined target area by the recognizer,
wherein
the predetermined target area is set around the host vehicle,
the apparatus operation controller determines whether the host vehicle enters or has entered a branching point,
the apparatus operation controller causes the onboard apparatus to perform the operation of notifying under a first condition if the apparatus operation controller does not determine that the host vehicle enters or has entered the branching point,
the apparatus operation controller causes the onboard apparatus to perform the operation of notifying under a second condition if the apparatus operation controller determines that the host vehicle enters or has entered the branching point,
the second condition is more severe than the first condition to perform the operation of notifying,
the apparatus operation controller executes the operation based on a result of a comparison between a threshold and a collision margin time,
the collision margin time is a predicted time until contact between the object and the host vehicle will occur, and
in response to determining that the host vehicle enters or has entered the branching point, the apparatus operation controller lowers a level of the operation by changing the threshold.

11. A non-transitory computer-readable recording medium having a program stored therein, the program causing an onboard computer to execute:
recognizing an object present around a host vehicle;
determining whether the object is recognized in a predetermined target area set around the host vehicle;
causing an onboard apparatus to perform at least an operation of notifying of a likelihood of contact between the host vehicle and the object in response to determining that the object has been recognized in the target area; and determining whether the host vehicle enters or has entered a predetermined branching point in which a diverging branching road extends from a main lane in a direction different from a travelling direction of the main lane, wherein the causing the onboard apparatus to perform at least the operation of notifying comprises:

causing the onboard apparatus to perform the operation under a first condition if the onboard computer does not determine that the host vehicle enters or has entered the predetermined branching point, and causing the onboard apparatus to perform the operation under a second condition if the onboard computer determines that the host vehicle enters or has entered the predetermined branching point, wherein the second condition is more severe than the first condition, and lowering a level of the operation executed in a lowering case as compared to another level of the operation executed in a case other than the lowering case, wherein the lowering case includes a case in which the object recognized in the target area by the recognizer is traveling along another lane adjacent to a host lane along which the host vehicle is traveling, the other lane being located on a distant side from a branching lane extending from the branching point.

\* \* \* \* \*